United States Patent
Odate et al.

(10) Patent No.: US 7,460,789 B2
(45) Date of Patent: Dec. 2, 2008

(54) OPTICAL TRANSMISSION SYSTEM AND METHOD OF CONTROLLING OPTICAL TRANSMISSION SYSTEM

(75) Inventors: Kaori Odate, Kawasaki (JP); Motoyoshi Sekiya, Kawasaki (JP); Takuya Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 565 days.

(21) Appl. No.: 11/019,420

(22) Filed: Dec. 23, 2004

(65) Prior Publication Data

US 2006/0013589 A1 Jan. 19, 2006

(30) Foreign Application Priority Data

Jul. 14, 2004 (JP) .............................. 2004-207206

(51) Int. Cl.
H04J 14/02 (2006.01)
H04B 10/12 (2006.01)

(52) U.S. Cl. ........................... 398/147; 398/159; 398/81
(58) Field of Classification Search ................ 398/147, 398/148, 159, 81
See application file for complete search history.

(56) References Cited

U.S. PATENT DOCUMENTS

| | | | |
|---|---|---|---|
| 5,218,662 A * | 6/1993 | Dugan | 385/123 |
| 5,365,362 A | 11/1994 | Gnauck et al. | |
| 5,524,144 A * | 6/1996 | Suzuki | 398/181 |
| 5,539,563 A * | 7/1996 | Park | 398/148 |
| 5,608,562 A * | 3/1997 | Delavaux et al. | 398/148 |
| 5,991,477 A * | 11/1999 | Ishikawa et al. | 385/24 |
| 6,229,631 B1 * | 5/2001 | Sato et al. | 398/30 |
| 6,570,691 B1 * | 5/2003 | Miyauchi et al. | 398/158 |
| 6,654,561 B1 * | 11/2003 | Terahara et al. | 398/26 |
| 6,741,389 B2 * | 5/2004 | Kumasako et al. | 359/334 |
| 6,768,872 B1 * | 7/2004 | Tsuritani et al. | 398/81 |
| 6,856,768 B2 * | 2/2005 | Gnauck et al. | 398/83 |
| 7,068,876 B1 * | 6/2006 | Tsuda et al. | 385/24 |
| 7,081,987 B2 * | 7/2006 | Bosloy et al. | 359/337.1 |
| 7,233,432 B2 * | 6/2007 | Islam et al. | 359/337 |
| 7,254,342 B2 * | 8/2007 | Odate et al. | 398/148 |

(Continued)

OTHER PUBLICATIONS

Patent Abstracts of Japan, Publication No. 2000-236297, Published Aug. 29, 2000.

Primary Examiner—M. R. Sedighian
(74) Attorney, Agent, or Firm—Staas & Halsey LLP

(57) ABSTRACT

A control method, which is applicable to a variety of network configurations, controls an optical transmission system to determine optimum optical input power to a transmission path for increased optical transmission quality. The optical transmission system has terminal stations, repeaters, dispersion compensation modules, and a dispersion compensation controller. The terminal stations transmit and receive an optical signal through an optical fiber transmission path. The repeaters are disposed in the optical fiber transmission path for amplifying the optical signal. The dispersion compensation modules are disposed in the terminal stations and the repeaters for compensating for dispersion of the optical signal. The dispersion compensation controller determines a target value for a nonlinear phase shift, which is an indication of a self-phase modulation caused by a transmission medium of the optical fiber transmission path, to have a maximum residual dispersion tolerance, and adjusts at least one of the input powers applied to transmission paths connected to the terminal stations or the repeaters and the input powers applied to the dispersion compensation modules to equalize the nonlinear phase shifts of paths in the optical transmission system to the target value.

15 Claims, 24 Drawing Sheets

U.S. PATENT DOCUMENTS

| | | |
|---|---|---|
| 7,263,296 B2 * | 8/2007 | Miyauchi et al. ............. 398/158 |
| 2003/0165285 A1 * | 9/2003 | Yu et al. ....................... 385/15 |
| 2004/0151510 A1 * | 8/2004 | Tanaka et al. ............... 398/147 |
| 2004/0190820 A1 * | 9/2004 | Uda ............................ 385/24 |
| 2004/0190911 A1 * | 9/2004 | Franco et al. ................ 398/189 |
| 2004/0208608 A1 * | 10/2004 | Tager et al. ................. 398/147 |
| 2005/0185964 A1 * | 8/2005 | Ishikawa ..................... 398/147 |
| 2006/0193638 A1 * | 8/2006 | Akiyama et al. ............ 398/147 |

\* cited by examiner

OPTICAL TRANSMISSION SYSTEM AND METHOD OF CONTROLLING OPTICAL TRANSMISSION SYSTEM

CROSS-REFERENCE TO RELATED APPLICATIONS

This application is based on, and claims priority to, Japanese Application No. 2004-207206, filed on Jul. 14, 2004, in Japan, and which is incorporated herein by reference.

BACKGROUND OF THE INVENTION

1. Field of the Invention

The present invention relates to an optical transmission system and a method of controlling an optical transmission system, and more particularly to a method of controlling an optical transmission system for compensating for chromatic dispersion that is caused when an optical signal is transmitted through an optical fiber, and an optical transmission system for transmitting an optical signal through an optical fiber while compensating for chromatic dispersion.

2. Description of the Related Art

In recent years, the WDM (Wavelength Division Multiplex) system for multiplexing light rays having different wavelengths to simultaneously transmit a plurality of signals through a single optical fiber has been used as a technology for high-speed large-capacity optical transmission.

Light is transmitted through an optical fiber at different speeds for different wavelengths (different wavelength components based on the spectrum of light). Therefore, when a pulse of light is transmitted over an increased distance, it suffers chromatic dispersion which deteriorates the pulse waveform. Chromatic dispersion represents the difference between the propagation times of two monochromatic light waves whose wavelengths differ 1 nm from each other, and is expressed in a unit of ps/nm. A dispersion coefficient represents the difference between the propagation times of two monochromatic light waves whose wavelengths differ 1 nm from each other when the monochromatic light waves are propagated for 1 km, and is expressed in a unit of ps/nm/km. For example, an SMF (Single Mode Fiber) that is usually used as an optical fiber has a dispersion coefficient in the range from 15 to 16 ps/nm/km in the vicinity of 1.55 µm. When an optical signal having a wavelength band width of 0.1 nm in the vicinity of 1.55 µm is applied to an SMF having a length of 100 km, a time difference ranging from 150 to 160 ps is developed between the longer and shorter wavelength sides of the wavelength band width at the exit end of the SMF, indicating that the signal waveform is distorted.

If the waveform of a transmitted optical signal is deteriorated by chromatic dispersion in the WDM system for high-speed large-capacity optical transmission, the characteristics of the received optical signal are greatly degraded, adversely affecting the WDM system. It is customary to compensate for the chromatic dispersion caused by the optical fiber by adding the same quantity of chromatic dispersion having an opposite sign to equivalently eliminating or canceling the chromatic dispersion. A process of performing such chromatic dispersion compensation in each span of the optical transmission path, e.g., between an optical signal transmitting terminal station and an optical signal repeater, between optical signal repeaters, and an optical signal repeater and an optical signal receiving terminal station, for designing the chromatic dispersion compensation over the optical transmission path from the optical signal transmitting terminal station to the optical signal receiving terminal station is referred to as dispersion management.

According to the dispersion management, dispersion compensation modules (DCMs) are disposed before or after repeaters on the transmission path and transceivers in the terminal stations, for compensating for chromatic dispersion produced on the transmission path.

FIG. 22 of the accompanying drawings is a diagram showing a dispersion map. The dispersion map represents a transition of accumulated residual dispersion on the vertical axis with respect to the distance on the horizontal axis. FIG. 22 shows a dispersion map M1 of accumulated dispersion in a central channel 40 when a WDM system 100 transmits 80 light waves that are multiplexed by way of WDM.

The WDM system 100 is a system for performing WDM transmission from a transmitting station 101 to a receiving station 102 through a transmission path in the form of an SMF as an optical fiber which has repeaters 103, 104 at equal repeating intervals or spans.

Since the SMF has a positive dispersion value, the transmitting station 101, the receiving station 102, and the repeaters 103, 104 have respective DCMs 105-1 through 105-4 having a negative dispersion value, e.g., modules constructed of dispersion compensation fibers (DCFs) having a negative dispersion value which are assembled as coils in a length to provide a desired dispersion value, for performing dispersion compensation. The DCM disposed in the transmitting terminal station is referred to as a DCT (Dispersion Compensation Terminal).

Even though the DCMs are used to compensate for chromatic dispersion, the waveform of a transmitted optical signal is distorted to degrade the transmission characteristics due to a nonlinear effect such as SPM (Self Phase Modulation) that is produced principally in the transmission path of the system. Therefore, a certain limit (an upper limit) is posed on the optical power of a signal that is applied to the transmission path. Typically in a system for amplifying and repeating an optical signal, reducing the optical power of the signal deteriorates the SNR (Signal to Noise Ratio) of the signal. Consequently, there is also a limit posed on the reduction of the optical power, i.e., a lower limit on the optical power. Under these circumstances, it has been the general practice to apply a constant value of optical power to the transmission path and the DCMs within a certain limitative optical power range which is established on the assumption that the span distances are equal to each other over the transmission path.

Similarly, the same value of optical signal input power (transmission path input power) within a certain limitative optical power range is applied to every span of the optical fiber transmission path, and the same value of optical signal input power (DCM input power) within a certain limitative optical power range is applied to every one of the DCMs 105-1 through 105-4.

A review of the dispersion map M1 indicates that the positive dispersion in the central channel over each span of the SMF is compensated for by the negative dispersion of the corresponding one of the DCMs 105-1 through 105-4.

The chromatic dispersion of the optical signal having the central wavelength has been described above. Actually, however, since a WDM signal made up of multiplexed wavelengths is transmitted through a transmission path, the dispersion caused by the transmission path differs from wavelength to wavelength. Stated otherwise, the chromatic dispersion depends on the transmitted wavelength, a property referred to as a dispersion slope, and the chromatic dispersion characteristics are different in all the channels, i.e., the dispersion slope is not flat.

A quantity of accumulated dispersion up to the receiver is called residual dispersion (RD), and a range of accumulated dispersion within a dispersion deterioration penalty range that is allowed by the system is called RD tolerance.

If a chromatic dispersion value deviates from the RD tolerance, then it cannot be ensured that the reception side can identify signals "0", "1" from each other, i.e., the deterioration of the eye aperture becomes so large that it is difficult to identify the data. Therefore, the WDM system is required to perform dispersion management such that all the multiplexed wavelengths or channels fall in the RD tolerance.

It has been proposed to compensate for chromatic dispersion with dispersion compensation modules having step-like dispersion values in an optical transmitter, an optical receiver, and optical repeaters, and to compensate for chromatic dispersion in an optical fiber transmission path with an optical phase conjugate unit (see, for example, Japanese unexamined patent publication No. 07-154324 (paragraph Nos. [0020] through [00281], FIG. 4)).

According to the conventional dispersion management as described above, it is assumed that DCMs are disposed at equal intervals on the optical fiber transmission path for performing dispersion compensation at equal spans, and a system is designed by giving the same value of transmission path input power within the limitative power range to every span of the optical fiber transmission path and giving the same value of DCM input power within the limitative power range to every DCM. Furthermore, inasmuch as the wavelength deterioration due to a nonlinear effect is greater over a longer distance, dispersion management has been applied to a path over a longest distance within the network.

In actually constructed systems, however, optical repeaters cannot be positioned at equal spans, and the spans have different distances and hence cause different losses. Consequently, each of the spans is not optimized for OSNR (Optical S/N Ratio) and nonlinear quantity. Moreover, the conventional system designing process is problematic in that if a WDM system is constructed as a network including an OADM (Optical Add Drop Multiplex) node or a HUB node in order to optimize itself for a dispersion map of a long-distance through path, a path interconnecting terminal stations, the transmission performance is greatly deteriorated with respect to new paths other than the through path which are produced by the OADM node or the HUB node.

FIG. 23 of the accompanying drawings shows a WDM system 110 including an OADM node. The WDM system 110 is constructed of a transmitting station 111, a receiving station 112, repeaters 113 through 116, and an OADM node 118. The OADM node 118 branches (drops) a WDM signal sent as an optical signal having a particular wavelength from the transmitting station 111 to a tributary which is on a different route from the receiving station 112, and inserts (adds) an optical signal having a particular wavelength from a tributary which is on a different route from the transmitting station 111 into a WDM signal on a through path from the OADM node 118 to the receiving station 112.

According to conventional dispersion management for the WDM system 110, a dispersion map for a longest-distance path P1 (through path) between the terminal stations 111, 112 is optimized, and a dispersion map for a branching path P2 for adding/dropping a signal at the OADM node 118 is not optimized. Therefore, there is developed a deviation between a residual dispersion value in the central channel at the receiving station 112 on the path P1 and a residual dispersion value in the central channel at the OADM node 118 on the branching path P2. Since the eye aperture at a reception point of the OADM node 118 is degraded much more than the eye aperture at a reception point of the receiving station 112, a limitation is posed on the number of wavelengths that can be added/dropped.

FIG. 24 of the accompanying drawings shows a WDM system 120 including a HUB node. The WDM system 120 is constructed of a transmitting station 111, first and second receiving stations 112a, 112b, repeaters 113 through 117, and a HUB node 119. The HUB node 119 has a function to send an optical signal having a particular wavelength, among WDM signals sent from the transmitting station 111, to the first receiving station 112a, and also to send other signals to the second receiving station 112b. After the WDM signals are sent from the transmitting station 111 to the HUB node 119 through a common path, i.e., a path through which all wavelengths (channels) are transmitted in common, the WDM signals are transmitted to the receiving stations 112a, 112b through branched paths.

In the WDM system 120 where the HUB node 119 is present, it has been the conventional practice to perform dispersion compensation optimized for a longest path P1 (it is assumed here that the distance between the HUB node 119 and the receiving station 112a is longer than the distance between the HUB node 119 and the receiving station 112b). Since a dispersion map for a path P3 branched by the HUB node 119 is not optimized, the residual dispersion tolerance of the path P3 is smaller than the residual dispersion tolerance of the path P1, tending to pose a limitation on the number of wavelengths that can be transmitted from the HUB node 119 to the receiving station 112b.

SUMMARY OF THE INVENTION

It is therefore an object of the present invention to provide an optical transmission system which is capable of performing highly accurate dispersion compensation for increased optical transmission quality with respect to many various network configurations having a plurality of paths including OADM nodes and HUB nodes in the system.

The term "path" used herein represents a route which an optical signal having a certain wavelength (channel) follows after it is sent until it is received. For example, in a typical WDM transmission system, an optical signal having a certain wavelength sent from a transmitting terminal station travels through a plurality of optical repeaters and then reaches a receiving terminal station. In a WDM transmission system including an OADM node between a transmitting terminal station and a receiving terminal station, an optical signal in a channel is sent from the transmitting terminal station, and extracted (dropped) at the OADM node via a certain route. An optical signal in another channel is sent from the transmitting terminal station, travels through the OADM node, and is received by the receiving terminal station via another path (through path). Similarly, in a WDM transmission system including a HUB node, an optical signal in a channel is sent from a transmitting terminal station, changes its way at the HUB node, and is received by a second receiving terminal station via a path. An optical signal in another channel is sent from the transmitting terminal station, travels through the HUB node, is received by a second receiving terminal station via another path (through path).

The term "span" used herein represents an interval between two nodes of an optical transmission system. For example, an interval between a transmitting terminal station and an optical repeater over an optical transmission path (optical fiber), an interval between an optical repeater and an optical repeater over an optical transmission path (optical fiber), an interval between an optical repeater and a receiving terminal station over an optical transmission path (optical fiber), and an interval between an optical repeater and an OADM node over an optical transmission path (optical fiber) are all referred to as a span.

To achieve the above object, there is provided a method of controlling an optical transmission system for compensating for chromatic dispersion that is caused when an optical signal is transmitted. The method includes the steps of determining a target value for a nonlinear phase shift, which is an indication of a self-phase modulation caused by a path through which the optical signal is transmitted, to have a maximum residual dispersion tolerance, determining at least one of the input power applied to a transmission path connected to a node providing the path and the input power applied to a dispersion compensation module providing the path, in order to equalize the nonlinear phase shift to the target value, and controlling the optical transmission system based on the determined input power.

To achieve the above object, there is also provided an optical transmission system for transmitting an optical signal while compensating for chromatic dispersion. The optical transmission system includes terminal stations for transmitting and receiving an optical signal through an optical fiber transmission path, repeaters disposed in the optical fiber transmission path for amplifying the optical signal, dispersion compensation modules disposed in the terminal stations and the repeaters for compensating for dispersion of the optical signal, and a dispersion compensation controller for determining a target value for a nonlinear phase shift, which is an indication of a self-phase modulation caused by a transmission medium of the optical fiber transmission path, to have a maximum residual dispersion tolerance, and adjusting at least one of the input powers applied to transmission paths connected to the terminal stations or the repeaters and the input powers applied to the dispersion compensation modules to equalize the nonlinear phase shifts of paths in the optical transmission system to the target value for a dispersion compensation control process.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
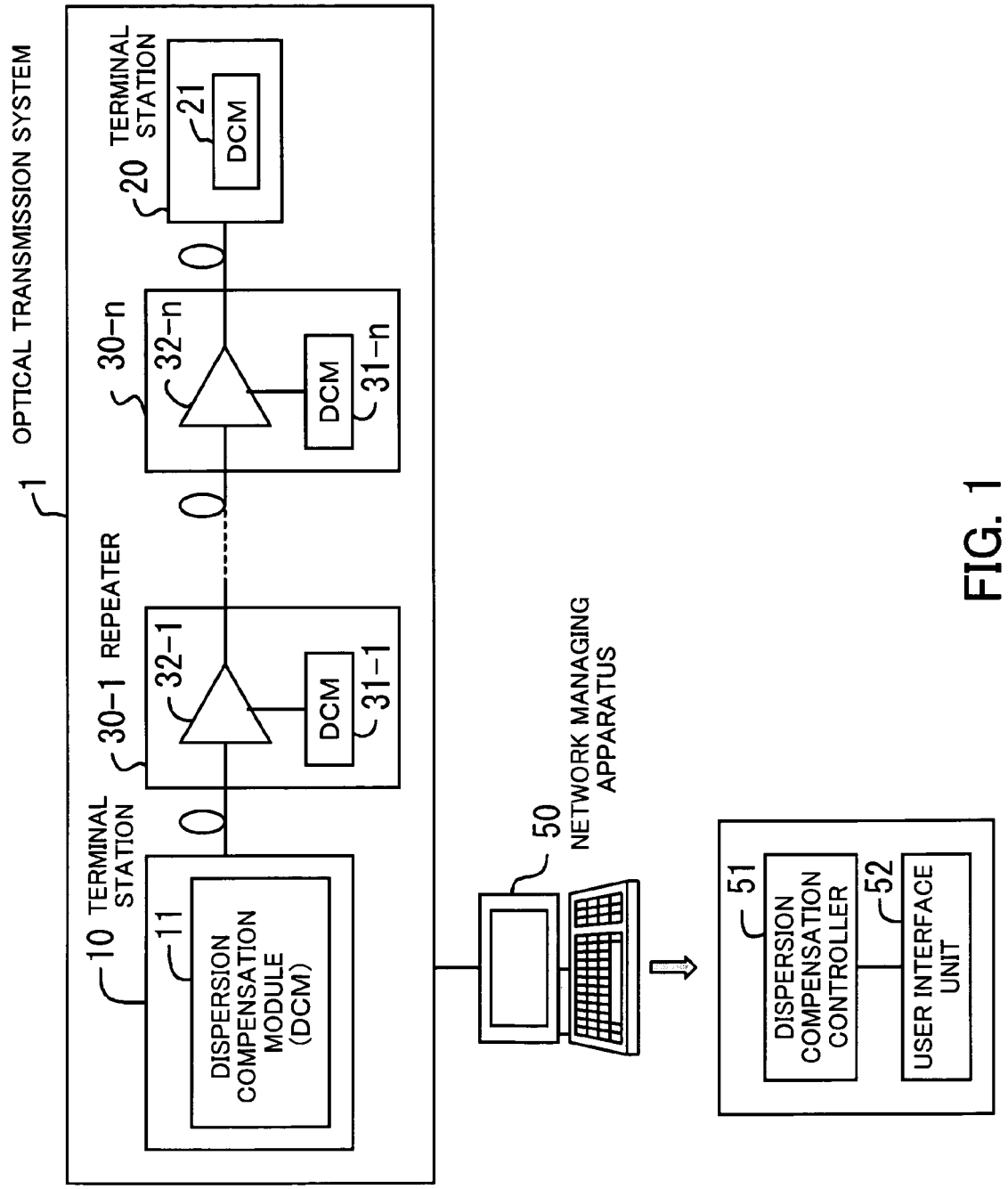
FIG. 1 is a block diagram showing the principles of an optical transmission system according to the present invention.

Embodiments of the present invention will hereinafter be described below. FIG. 1 shows in block form the principles of an optical transmission system 1 according to the present invention. The optical transmission system 1 is a system for transmitting an optical signal while performing dispersion compensation thereon. Though the optical transmission system 1 is shown as a unidirectional system in FIG. 1, the optical transmission system 1 is actually a bidirectional system which has the functions of the present invention with respect to both directions. However, the arrangement and operation of the unidirectional system will be described below.

As shown in FIG. 1, the optical transmission system 1 has terminal stations 10, 20 for sending and receiving optical signals. The optical transmission system 1 also has repeaters 30-1 through 30-n including respective optical amplifiers 32-1 through 32-n and disposed in an optical fiber transmission path for amplifying optical signals. The optical transmission system 1 further has dispersion compensation modules (hereinafter referred to as DCMs) 11, 21, 31-1 through 31-n disposed in the terminal stations 10, 20 and the repeaters 30-1 through 30-n for performing dispersion compensation on optical signals.

A network managing apparatus 50 connected to the optical transmission system 1 comprises a dispersion compensation controller 51 and a user interface unit 52. The dispersion compensation controller 51 determines a target value for a nonlinear phase shift, which is an indication of a self-phase modulation caused by the transmission medium, to have a maximum residual dispersion tolerance, and calculates and adjusts at least one of the input powers applied to transmission paths connected to the terminal stations 10, 20 or the repeaters 30-1 through 30-n and the input powers applied to the DCMs 11, 21, 31-1 through 31-n. The user interface unit 52 provides the network administrator with a user interface for the operation and maintenance of the network and the simulation of a dispersion compensation control process according to the present invention.

The dispersion compensation controller 51 can use an OSC (Optical Supervisory Channel) signal, for example, to set calculated input power levels in the terminal stations 10, 20, and the repeaters 30-1 through 30-n. The OSC signal is an optical supervisory control signal having a transmission rate ranging from 1.5 to 150 Mb/s. and used to make operational settings, monitor statuses, and detect transmission path faults of WDM systems.

Prior to describing details of the present invention, a residual dispersion tolerance curve which is an indication of a residual dispersion tolerance, problems to be solved by the invention and a nonlinear phenomenon used to achieve a residual dispersion tolerance according to the present invention in networks including an OADM node and a HUB node will be described below. First, a specific example of a residual dispersion tolerance curve will be described below.

Figure 2:
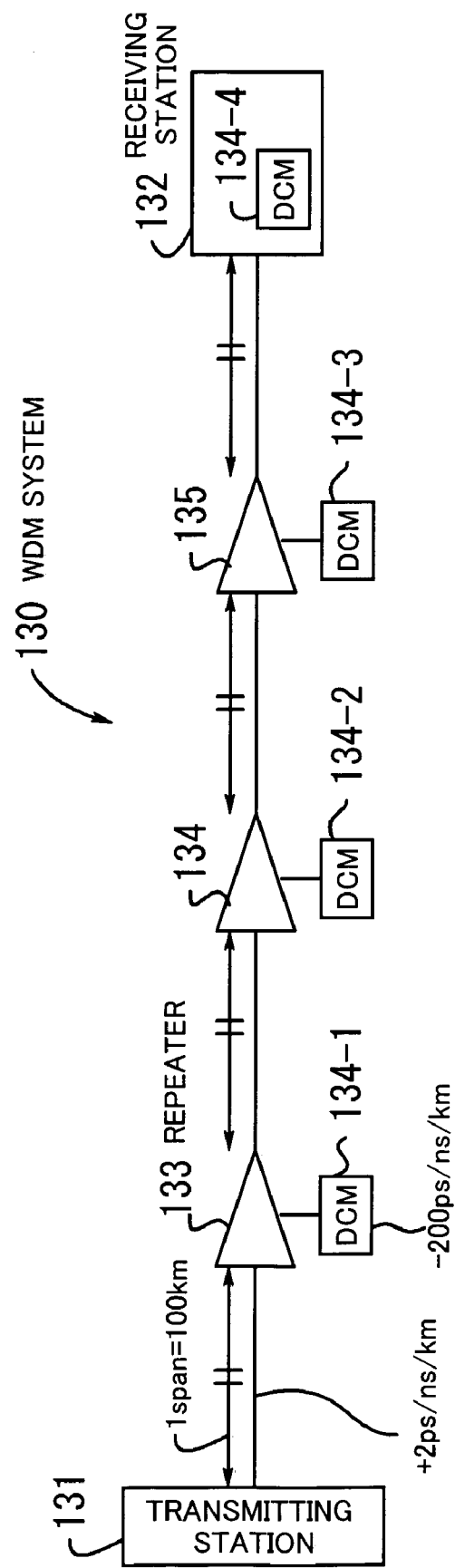
FIG. 2 is a block diagram showing by way of example a WDM system with dispersion management.

FIG. 2 shows in block form a WDM system 130 with dispersion management by way of example. The WDM system 130 has a transmitting station 131, a plurality of repeaters 133 through 135, and a receiving station 132 which are connected in a serial sequence by an optical fiber for transmitting 80 WDM signals in channels 1 through 80. The WDM system 130 also has a plurality of DCMs 134-1 through 134-4 associated respectively with the repeaters 133 through 135 and the receiving station 132.

Figure 3:
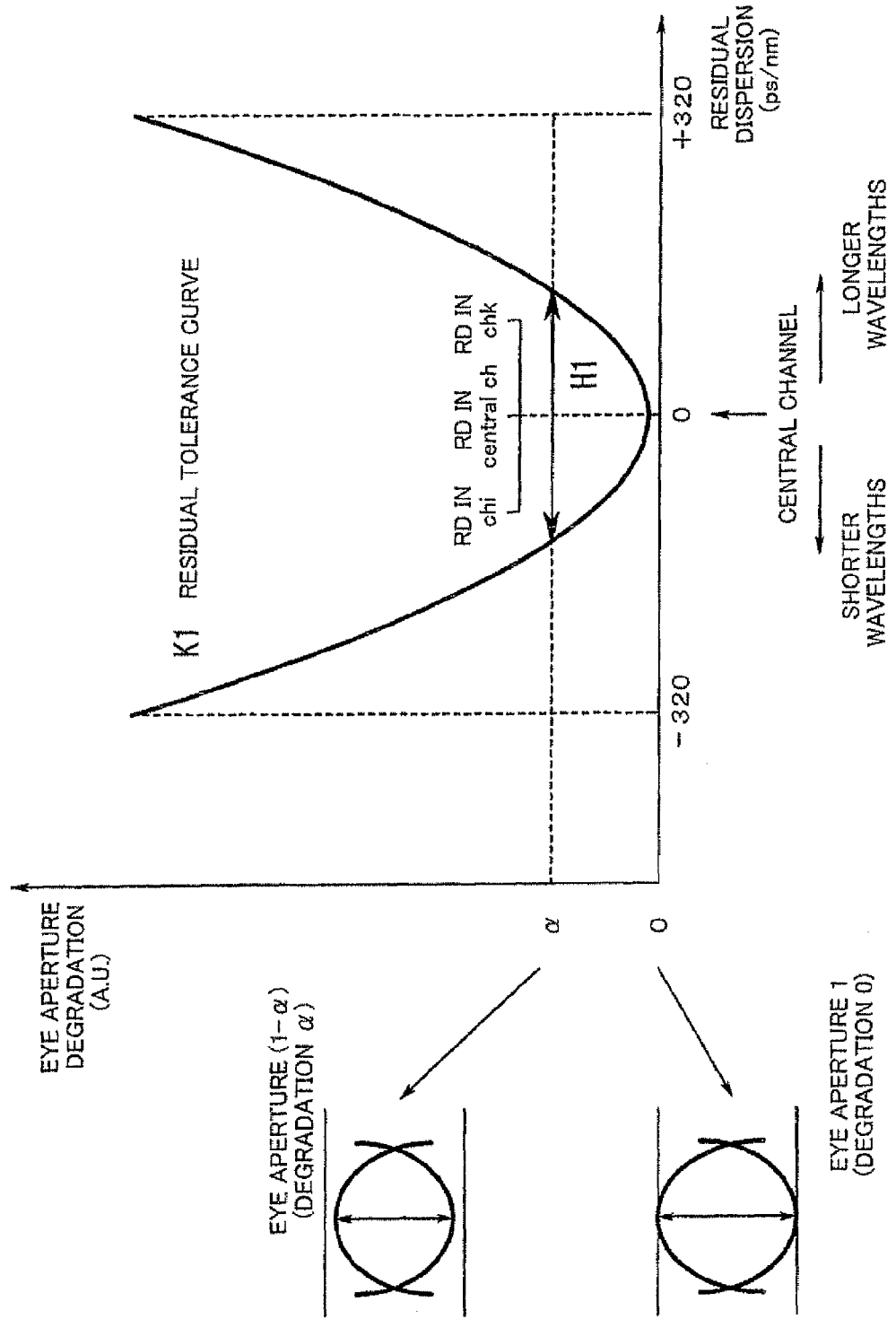
FIG. 3 is a diagram showing a residual dispersion tolerance curve.

FIG. 3 shows a residual dispersion tolerance curve. In FIG. 3, the vertical axis represents eye aperture degradation (A.U.: Arbitrary Unit), and the horizontal axis residual dispersion (ps/nm). A residual dispersion tolerance curve K1 is obtained by determining eye aperture degradation levels corresponding to respective residual dispersion values within a residual dispersion range −320 through 0 through +320, and plotting a curve along the determined eye aperture degradation levels. Actually, the residual dispersion tolerance curve K1 is calculated by way of a simulation using a plurality of parameters including a transmission path input power, a nonlinear coefficient, etc. in addition to wavelengths, a transmission distance, a dispersion coefficient, etc.

If the eye aperture degradation level that can be permitted by the receiving station 132 when it receives a WDM signal is determined to be of a constant value $\alpha$, then a range of residual dispersion tolerance values to be maintained by the receiving station 132 is represented by H1 in FIG. 3. Stated otherwise, if the residual dispersion (RD) levels in all the channels fall within the range H1, then the eye aperture degradation of the received waveform is equal to or smaller than the constant value $\alpha$, allowing the receiving station 132 to identify the data of all the wavelengths normally. Consequently, according to the dispersion management, the residual dispersion in the central channel, i.e., the channel at the central wavelength of the wavelength band, is determined so that the residual dispersion levels in all the channels fall within the range H1.

Even if a WDM signal of multiplexed wavelengths is handled, as described above, a residual dispersion tolerance curve for a single wavelength, e.g., a central wavelength, is normally determined, and tolerance ranges for all the multiplexed wavelengths are judged from the determined residual dispersion tolerance curve.

Figure 4:
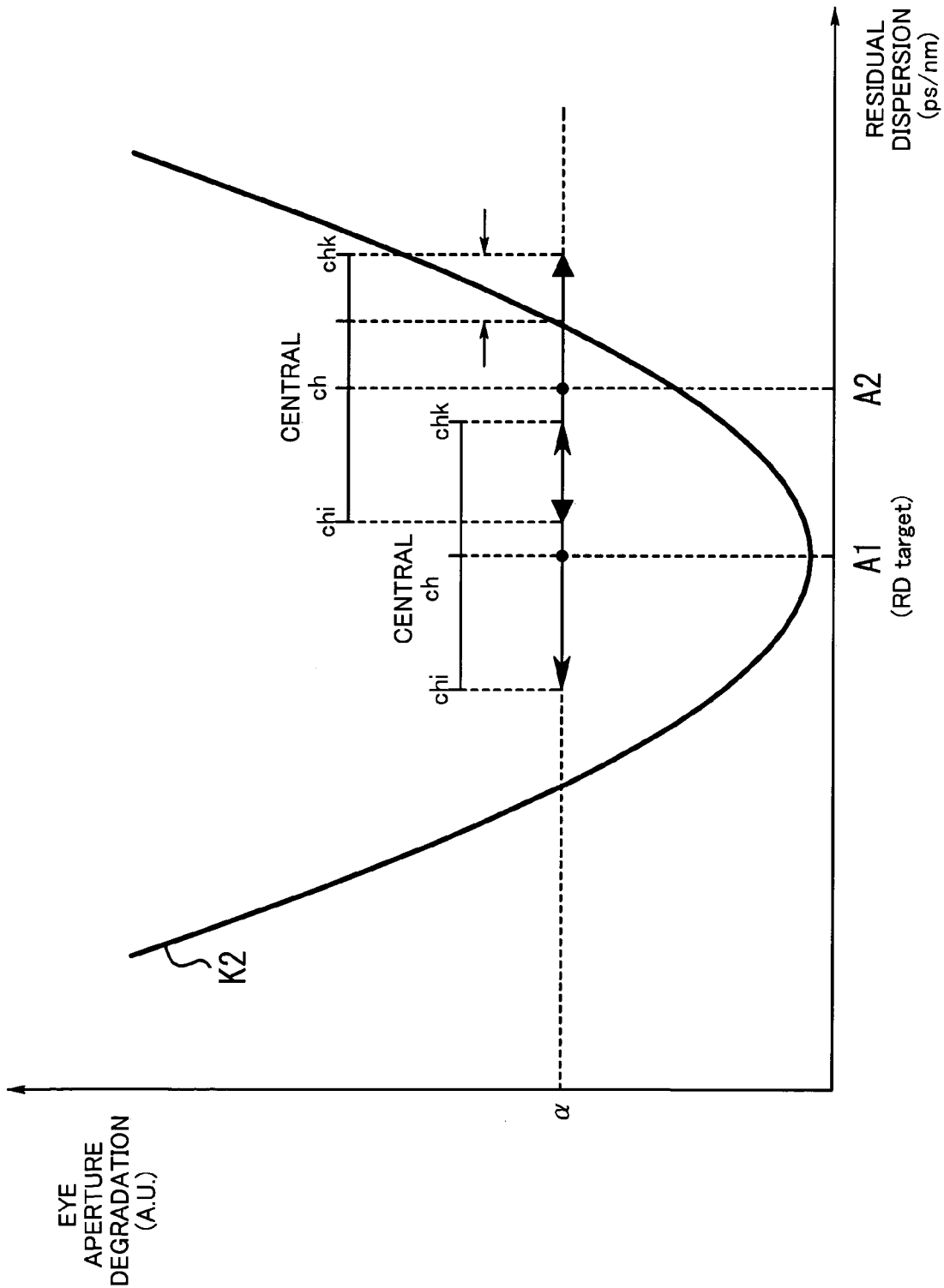
FIG. 4 is a diagram showing a problem which occurs in a network including an OADM node.

Problems of networks including an OADM node and a HUB node, as described above with reference to FIGS. 23 and 24, will be described below using a residual dispersion tolerance curve. FIG. 4 is a diagram showing problems which occurs in a network including an OADM node.

Figure 23:
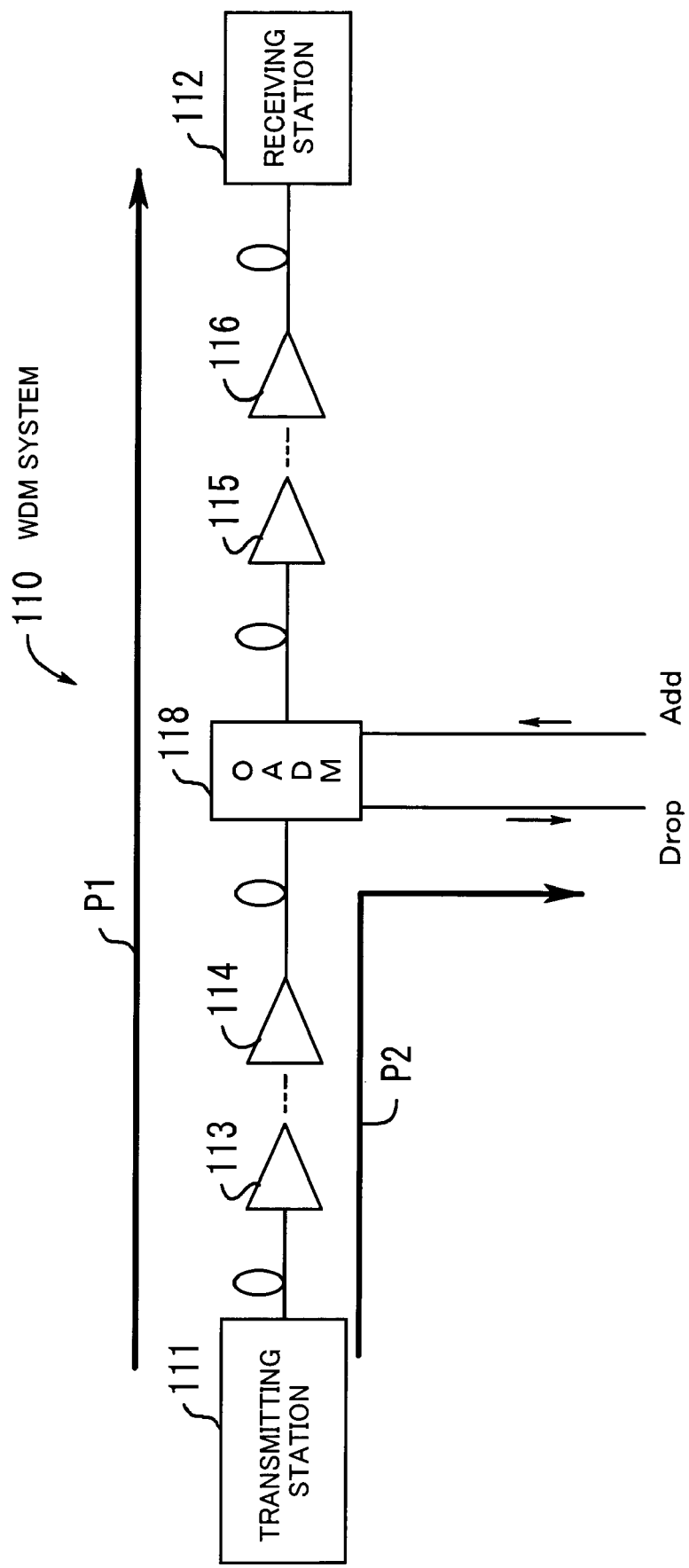
FIG. 23 is a block diagram of a WDM system including an OADM node.
Figure 24:
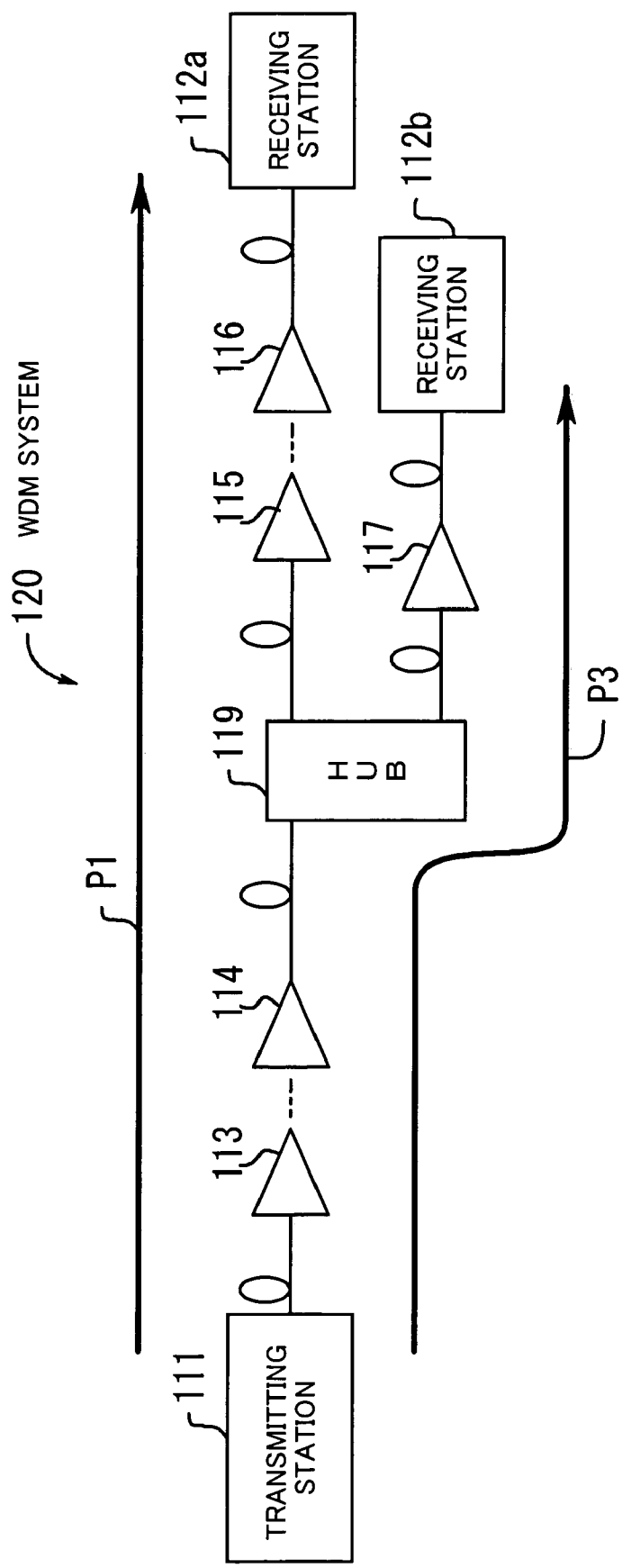
FIG. 24 is a block diagram of a WDM system including a HUB node.

It is assumed that the WDM system 110 shown in FIG. 23 transmits a WDM signal, and a residual dispersion tolerance curve obtained when a dispersion map of the through path P1 from the transmitting station 111 through the OADM node 118 to the receiving station 112 is represented by K2 in FIG. 4.

If the constant value $\alpha$ of eye aperture degradation indicates an allowable range and the residual dispersion in the central channel at the receiving station 112 shown in FIG. 23 is represented by A1 in FIG. 4, then the waveform deterioration due to the residual dispersion in all the channels of the WDM signal is reduced to the constant value $\alpha$ or less. Therefore, with respect to the path P1, a dispersion management design is made such that a residual dispersion target (RD target) in the central channel is represented by A1.

Now, a signal dropped at the OADM node 118 on the path P2 which extends from the transmitting station 111 and is branched by the OADM node 118 will be analyzed. When a WDM signal sent from the transmitting station 111 is received by the OADM node 118, since the residual dispersion in the central channel is represented by A2 in FIG. 4 (if it is assumed that the OADM node 118 is located near the intermediate position on the path P1 and the residual dispersion at the reception point at the OADM node 118 is of a positive value, then the residual dispersion is represented by A2), some channels that are shifted from the central channel toward longer wavelengths fall (are assumed to fall) outside of the range wherein the eye aperture degradation is equal to or less than the constant value $\alpha$ at the OADM node 118.

At the time the WDM signal is received by the OADM node 118, the identification of data in those channels which correspond to one quarter of the entire band at longer wavelengths in the example shown in FIG. 4 is not ensured, and those channels which can be dropped correspond to only three quarters of the entire band. Thus, a limitation is posed on the number (wavelength band) of channels which can be dropped, failing to provide satisfactory services to users.

Figure 5:
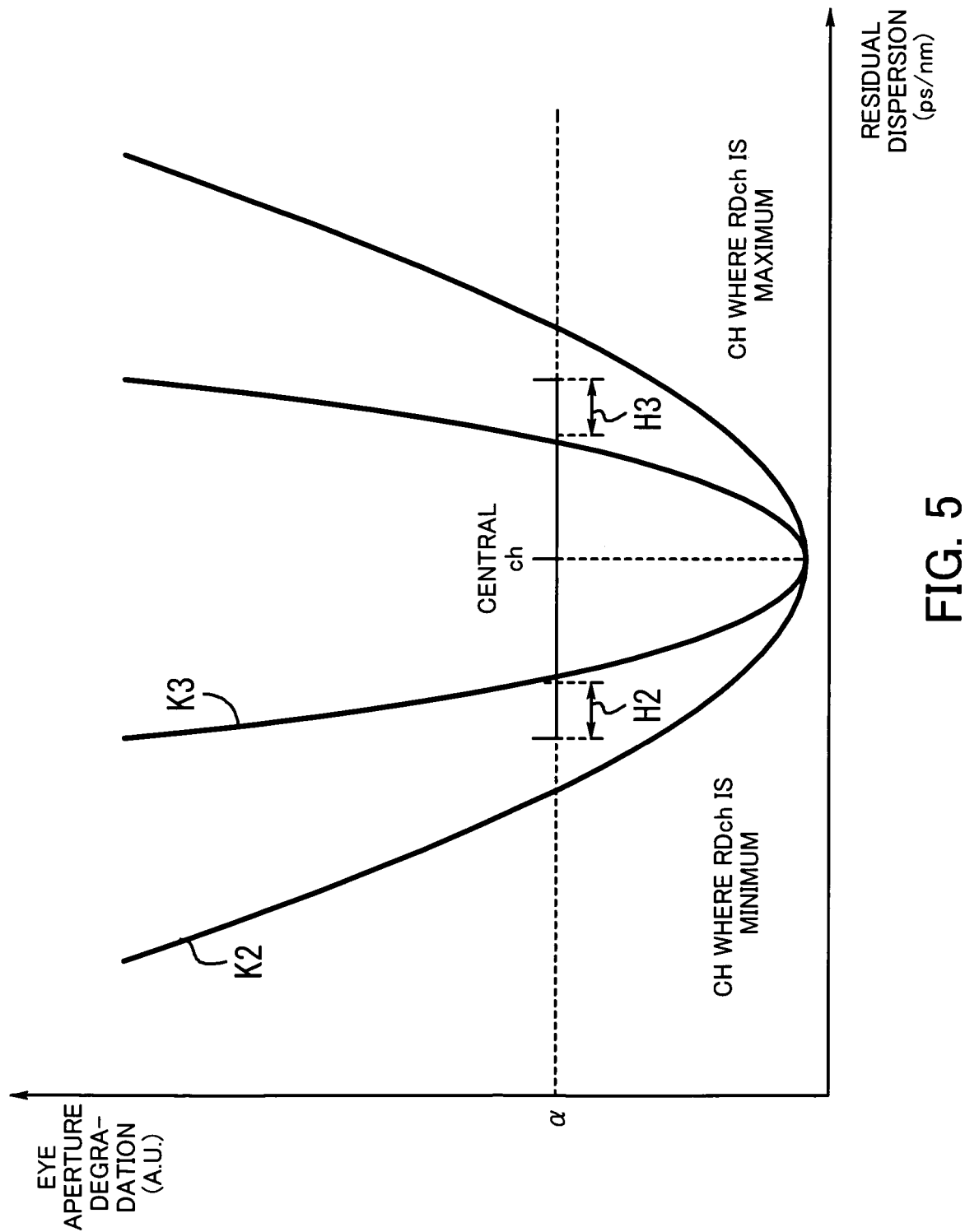
FIG. 5 is a diagram showing a problem which occurs in a network including a HUB node.

FIG. 5 is a diagram showing problems which occurs in a network including a HUB node. It is assumed that in the WDM system 120 shown in FIG. 24, the path P3 along which a certain channel of a WDM signal sent from the transmitting station 111 is branched by the HUB node 119 and directed to the receiving station 112b is shorter than the through path P1 along which a certain channel of a WDM signal sent from the transmitting station 111 is directed through the HUB node 119 to the receiving station 112a. As shown in FIG. 5, a residual dispersion tolerance curve K3 of the path P3 has a smaller dispersion tolerance range than a residual dispersion tolerance curve K2 of the path P1 at the same eye aperture degradation level.

It can be seen from FIG. 5 that in the receiving station 112b on the branched path P3, the residual dispersion range at each wavelength where the eye aperture degradation level has a constant value $\alpha$ or less is smaller than on the through path P1.

This poses a limitation on the wavelengths that can be received by the receiving station 112b, failing to ensure the identification of data in channels within ranges H2, H3. Stated otherwise, some of the channels that fall within the allowable range of residual dispersion on the through path P1 fall outside the allowable range of residual dispersion on the branched path P3. Therefore, the HUB node 119 is unable to branch all the transmission wavelengths (channels) that are being used to the receiving station 112b, but able to branch only some of the channels, tending to cause a reduction in services (a limitation on a system design).

The nonlinear phenomenon and the relationship between the nonlinear phenomenon and the residual dispersion tolerance will be described below. The term "nonlinear phenomenon" used in the context of optical transmission is typically a phenomenon in which when light having a relatively strong power is propagated through glass, a property (refractive index) of the glass changes depending on the intensity of the light. Nonlinear phenomena caused in an optical fiber include self-phase modulation (SPM), cross-phase modulation (XPM), and four-wave mixing (FWM).

SPM is a phenomenon in which a phase shift is produced upon transmission of one light wave. XPM is a phase shift phenomenon that is caused when light waves having different wavelengths are simultaneously transmitted in one direction. FWM is a phenomenon in which a light wave having a new wavelength is produced when two or more light waves having respective wavelengths are entered.

These nonlinear phenomena caused in the optical fiber transmission path are responsible for the generation of noise and waveform distortions to degrade the transmitted signal. Therefore, it is generally desirable not to develop nonlinear phenomena as much as possible in optical fiber transmission. However, a nonlinear phenomenon may be effective to improve optical transmission quality depending on how it is applied. For example, the residual dispersion tolerance may be increased by positively utilizing a nonlinear phenomenon within a certain range.

Figure 6:
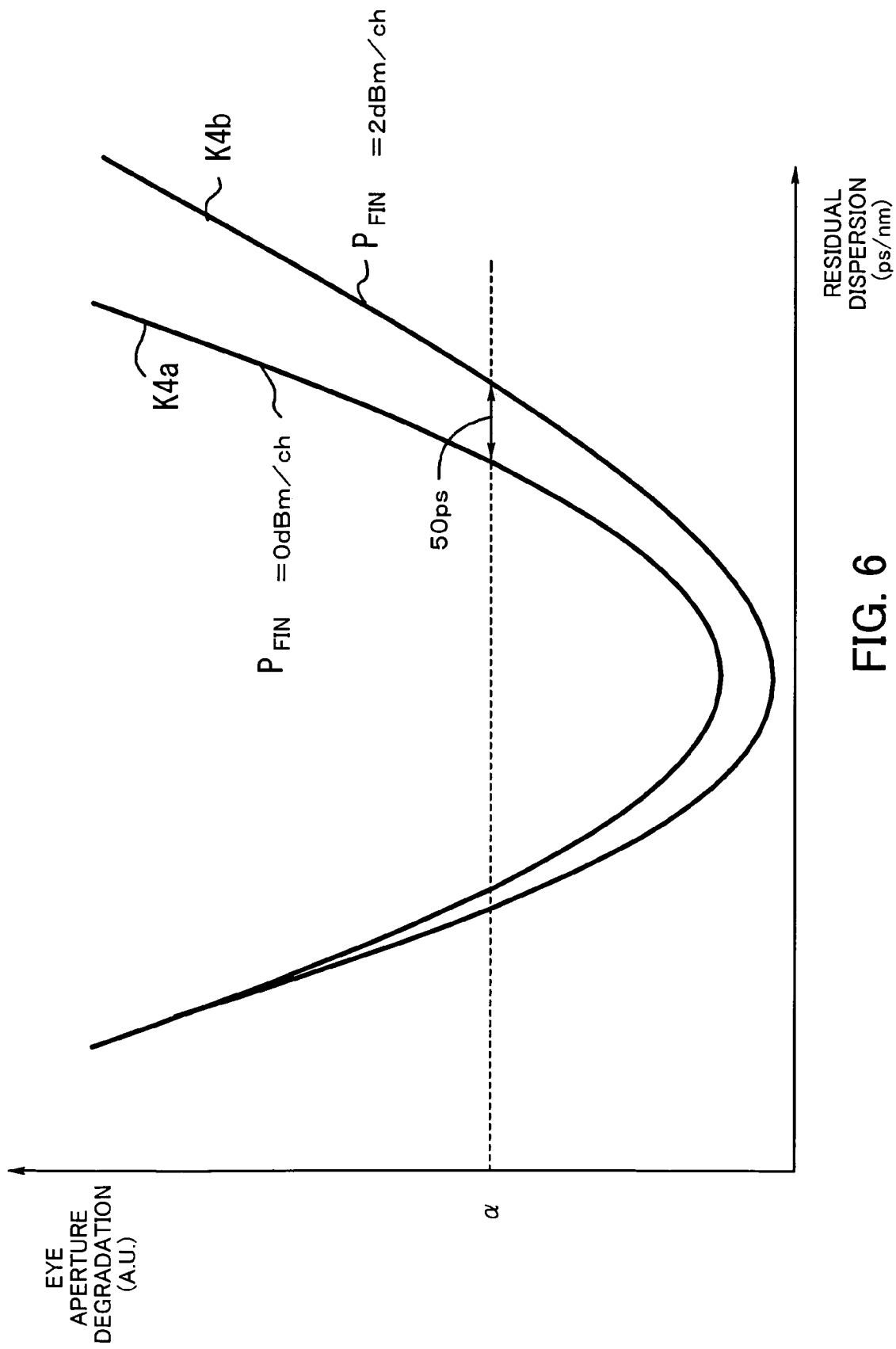
FIG. 6 is a diagram showing the manner in which a residual dispersion tolerance curve spreads due to a nonlinear phenomenon.

FIG. 6 shows the manner in which a residual dispersion tolerance curve spreads due to a nonlinear phenomenon. According to SPM, the refractive index of a medium changes depending on the power of light that is propagated through the medium such that the produced amount of nonlinear phenomenon increases as the power of light increases. In FIG. 6, a residual dispersion tolerance curve K4$a$ is plotted when the power $P_{FIN}$ of light applied to the transmission path is set to 0 dBm/ch, and a residual dispersion tolerance curve K4$b$ is plotted when the power $P_{FIN}$ of light applied to the transmission path is set to 2 dBm/ch. It can be understood from FIG. 6 that the residual dispersion tolerance is spread about 50 ps when the eye aperture degradation is of the constant value α.

It can thus been seen that as the power of light applied to the transmission path is increased to increase the generated amount of SPM, the residual dispersion tolerance curve spreads its shape (the tolerance width of residual dispersion). However, since the tolerance becomes rather smaller if the nonlinear effect is too strong, the nonlinear effect should be neither too strong not too weak for increasing the residual dispersion tolerance. It is of importance to increase the residual dispersion tolerance by utilizing the nonlinear effect appropriately within a certain range.

According to the present invention, light power control is performed to maximize the residual dispersion tolerance, thereby adjusting the generated amount of a nonlinear phenomenon, i.e., SPM, so that the residual dispersion tolerance can effectively be maintained for increased optical transmission quality with respect to a wide variety of network topologies including OADM and HUB nodes.

Details of the present invention will be described below. According to the present invention, at least one of the input power applied to a transmission path and the input power applied to a DCM including a DCF is adjusted to change the generated amount of SPM for achieving an optimum residual dispersion tolerance. First, a process of quantifying a generated amount of SPM will be described below.

A generated nonlinear amount of SPM, which is representative of how effective a nonlinear phenomenon is, is indicated by a nonlinear phase shift. The nonlinear phase shift $\phi_{NL}$ is expressed by the equation (1a) shown below. In the equation (1a), λ represents the wavelength, n2 the nonlinear coefficient, Aeff the effective cross-sectional area, Leff the effective fiber length, and I the input power. If a loss coefficient is represented by α, then the effective fiber length Leff is expressed by the equation (1b) where L represents the length of the fiber.

$$\phi_{NL} = \frac{2\pi}{\lambda} \cdot \frac{n2}{Aeff} \cdot I \cdot Leff \quad (1a)$$

$$Leff = \frac{1 - \exp(-\alpha L)}{\alpha} \quad (1b)$$

It can be seen from the equation (1a) that when the input power I is changed, the nonlinear phase shift $\phi_{NL}$ is changed.

Figure 7:
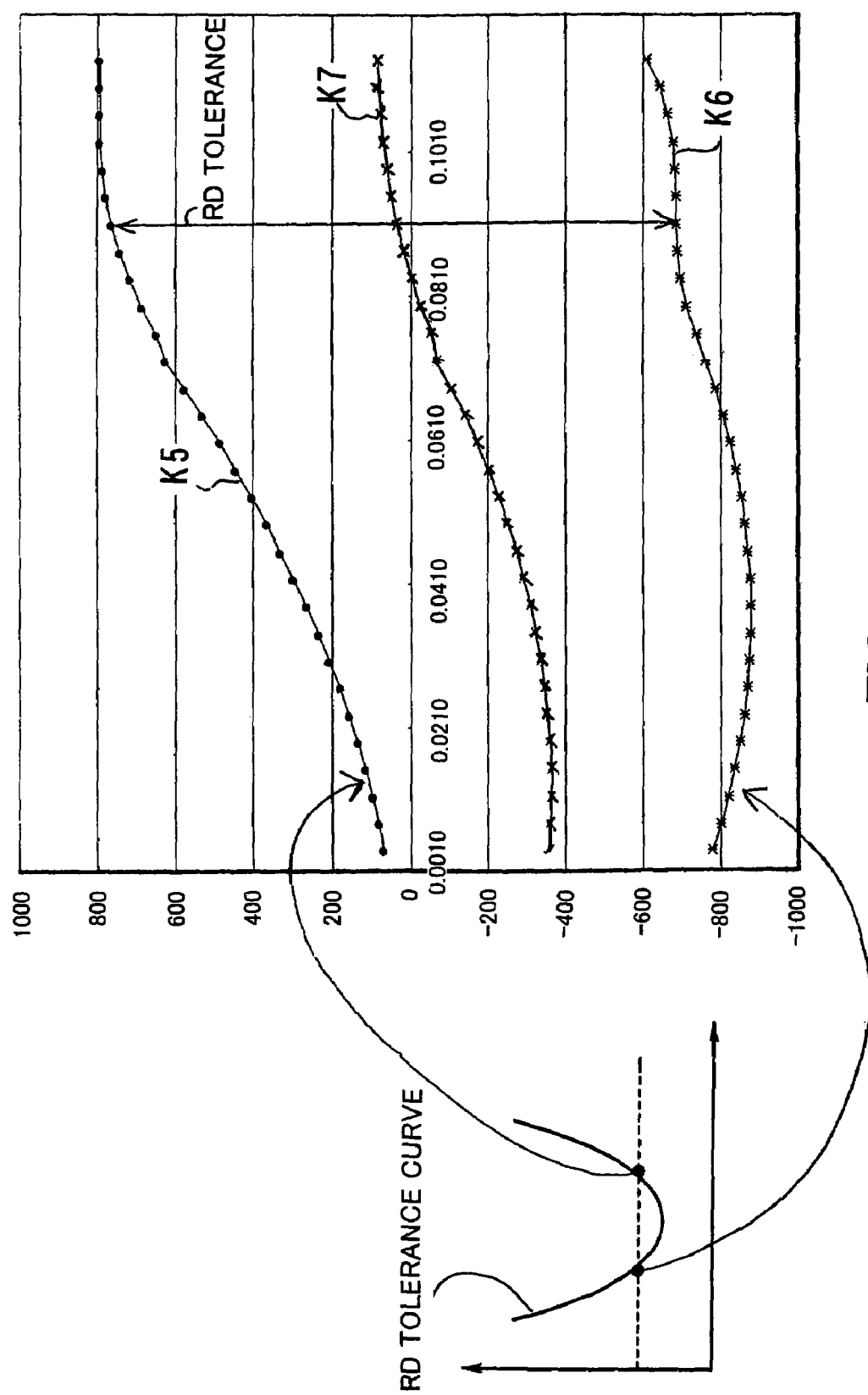
FIG. 7 is a diagram showing the relationship between the nonlinear phase shift and the residual dispersion.

A process of determining a nonlinear phase shift which maximizes the residual dispersion tolerance will be described below. FIG. 7 is a diagram showing the relationship between the nonlinear phase shift $\phi_{NL}$ and the residual dispersion. In FIG. 7, the horizontal axis represents the nonlinear phase shift $\phi_{NL}$ and the vertical axis represents the residual dispersion (ps/nm).

With respect to a certain path in a system, the input power applied to the transmission path is changed in a simulation through steps of 0.2 dBm/ch in the range from −3 dBm/ch to +3 dBm/ch, and the relationship between the nonlinear phase shift $\phi_{NL}$ and the residual dispersion is plotted to obtain curves K5, K6.

The curves K5, K6 correspond respectively to maximum and minimum values of the residual dispersion at a certain eye aperture degradation of the residual dispersion tolerance curve. Therefore, the interval (difference) between the curves K5, K6 corresponds to a residual dispersion tolerance. A curve K7 plotted by interconnecting intermediate points of the residual dispersion tolerance corresponds to an optimum residual dispersion level of the central channel.

Figure 8:
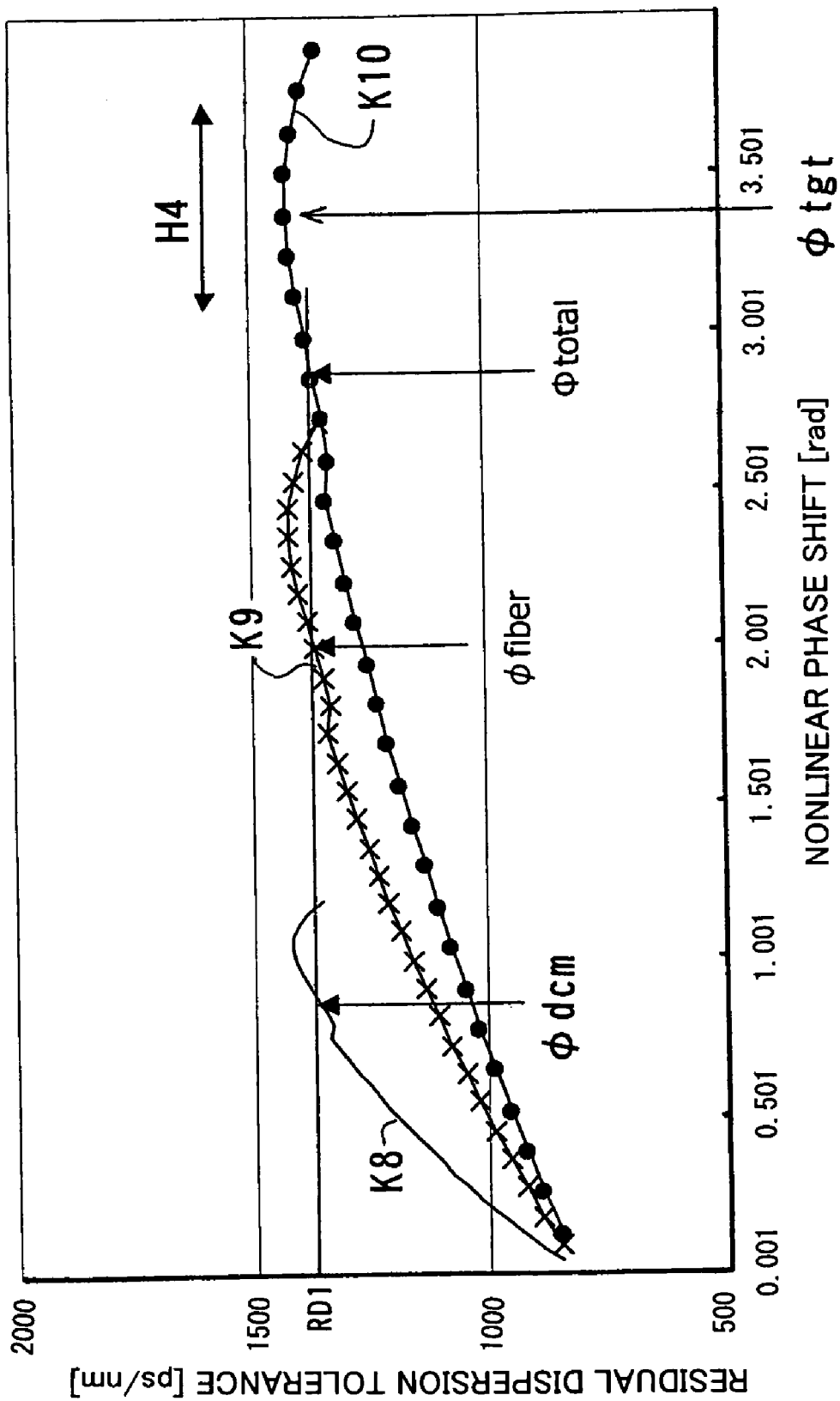
FIG. 8 is a diagram showing the relationship between the nonlinear phase shift and the residual dispersion tolerance.

FIG. 8 is a diagram showing the relationship between the nonlinear phase shift $\phi_{NL}$ and the residual dispersion tolerance. In FIG. 8, the horizontal axis represents the nonlinear phase shift $\phi_{NL}$ (rad) and the vertical axis represents the residual dispersion tolerance (ps/nm). The relationship shown in FIG. 8 is a graph representing the residual dispersion tolerance shown in FIG. 7.

A curve K8 represents the residual dispersion tolerance of a DCM (DCF: dispersion-compensated fiber), a curve K9 represents the residual dispersion tolerance of a fiber transmission path, and a curve K10 represents the residual dispersion tolerance of a total transmission path including the DCM and the fiber transmission path.

A review of the curve K10 indicates that since the residual dispersion tolerance takes a maximum value in a range H4, a value on the horizontal axis where the residual dispersion tolerance falls in the range H4 becomes a target value $\phi$tgt for the nonlinear phase shift to be determined. The input power applied to the transmission path and the input power applied to the DCM are adjusted for dispersion compensation control to equalize the nonlinear phase shift of a certain path to the target value $\phi$tgt.

If an auxiliary line is drawn at a residual dispersion tolerance RD1, then the values on the horizontal axis where the auxiliary line crosses the curves K8 through K10 become nonlinear phase shifts of the DCM, the optical fiber, and the total transmission path. Specifically, for the residual dispersion tolerance to be RD1, a total nonlinear phase shift of a certain path is determined to be $\phi$total from the graph. The nonlinear phase shift of the DCM at this time is φdcm, and the nonlinear phase shift of the optical fiber is determined as φfiber (∵ φtotal=φdcm+φfiber).

Dispersion compensation control processes according to first through sixth embodiments of the present invention for various networks will be described below. The dispersion compensation control process according to the first embodiment is a dispersion compensation control process for a network including only a through path.

A network including only a through path refers to a network wherein all wavelengths (channels) of a WDM signal sent from a transmitting station are received by one receiving station.

Figure 9:
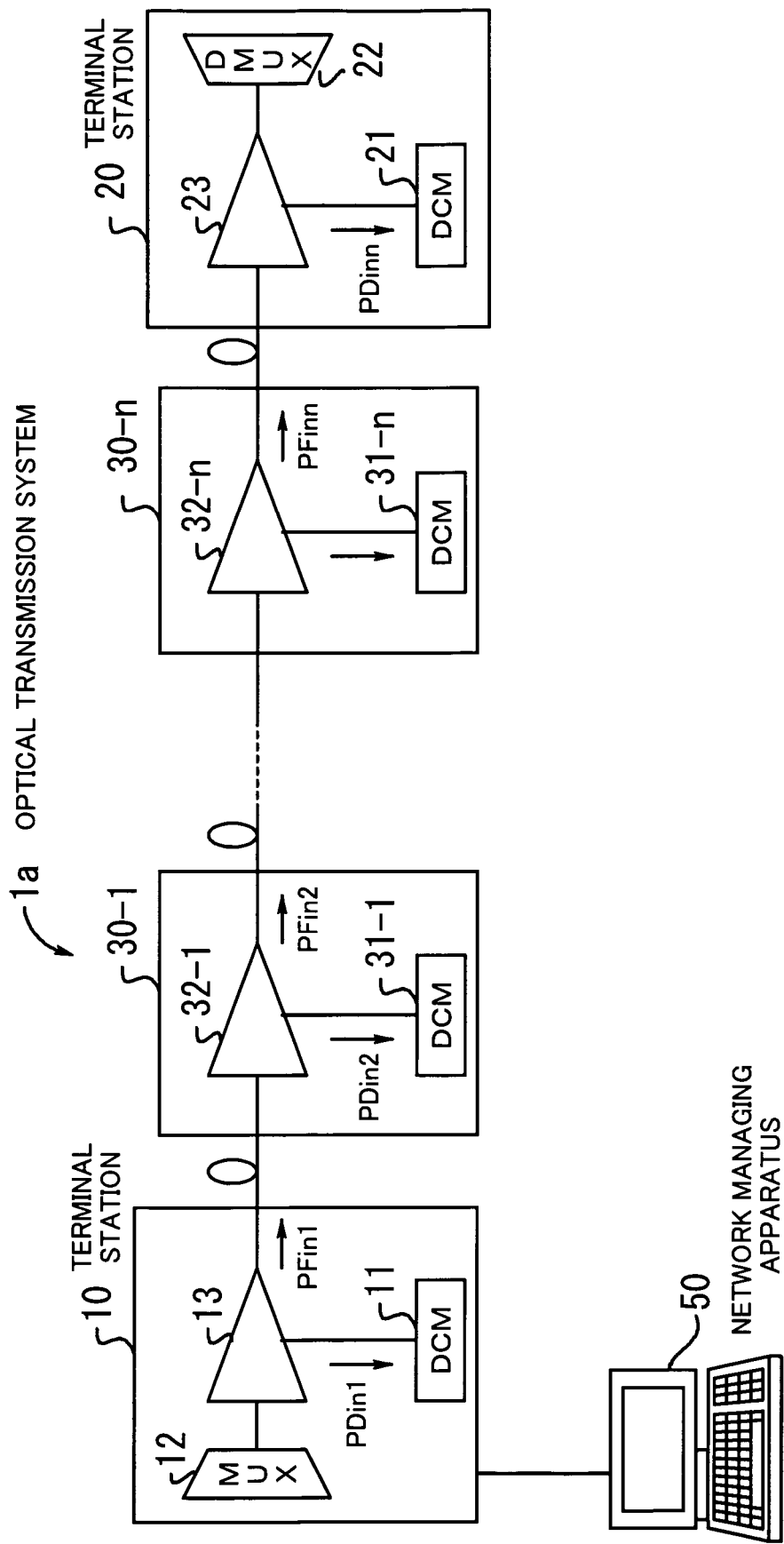
FIG. 9 is a block diagram of an optical transmission system configured as a through path.

FIG. 9 shows an optical transmission system 1a configured as a through path. The optical transmission system 1a does not include an OADM node and a HUB node for directing some of wavelengths (channels) of a WDM signal sent from a transmitting station toward another route, but has only a through path from terminal to terminal, i.e., from a terminal station 10 to a terminal station 20. The number of spans is N.

The terminal station 10 includes a DCM 11, a MUX 12, and an optical amplifier 13. The MUX 12 is a waveform multiplexer for generating a WDM signal. The terminal station 20 includes a DCM 21, a DMUX 22, and an optical amplifier 23. The DMUX 22 is a waveform demultiplexer for separating a WDM signal into wavelengths.

The optical transmission system 1a has repeaters 30-1 through 30-n having respective DCMs 31-1 through 31-n and respective optical amplifiers 32-1 through 32-n. A network managing apparatus 50 is connected to the terminal station 10. In FIG. 9, PDin1 through PDinn represent input powers applied to the respective DCMs and PFin1 through PFinn represent input powers applied to the transmission path.

A nonlinear phase shift φtotal of the path from terminal to terminal is represented by the equation (2) shown below. In the equation (2), φFm represents the nonlinear phase shift of a span m of the fiber transmission path and φDm represents the nonlinear phase shift of the DCM.

$$\phi total = [\phi F1 + \phi F2 \ldots + \phi Fn] + [\phi D1 + \phi D2 \ldots + \phi Dn] \quad (2)$$

The nonlinear phase shift φFm of the fiber transmission path and the nonlinear phase shift φDm of the DCM can roughly be estimated according to the respective equations (3a), (3b) where Leff represents the effective fiber length.

$$\phi Fm = Pfinm \cdot Leffm \quad (3a)$$

$$\phi Dm = Pdinm \cdot Leffm \quad (3b)$$

Figure 10:
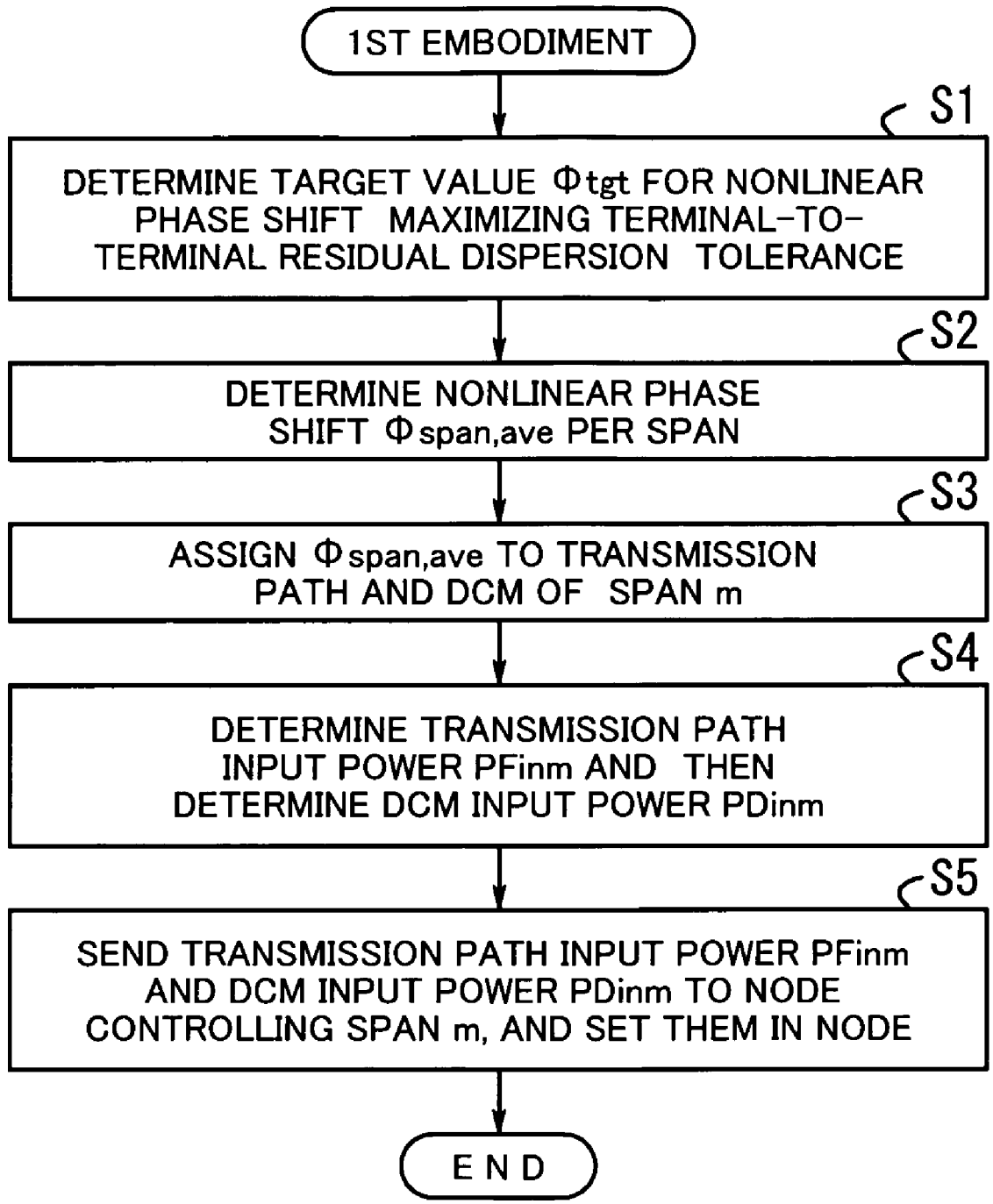
FIG. 10 is a flowchart of a processing sequence according to a first embodiment of the present invention.

FIG. 10 shows a processing sequence according to the first embodiment of the present invention. The illustrated processing sequence represents an operation flow of the network managing apparatus 50 which is carried out as a dispersion compensation control process for the optical transmission system 1a.

[S1] A target value φtgt for the nonlinear phase shift which maximizes the residual dispersion tolerance of the through path from terminal to terminal is determined by simulations as shown in FIGS. 7 an 8.

[S2] A nonlinear phase shift φspan,ave per span is determined according to the following equation (4):

$$\phi span, ave = \frac{\phi tgt}{N} \quad (4)$$

[S3] A nonlinear phase shift of the span m is assigned to the nonlinear phase shift of the fiber transmission path and the nonlinear phase shift of the DCM according to the following equation (5):

$$\phi span, ave = \phi Fm + \phi Dm \quad (5)$$

[S4] If there is a limitation on the input power applied to the transmission path (e.g., if the input power applied to the transmission path is limited by an output of an EDFA (Erbium Doped Fiber Amplifier or limited by the nonlinear effect of an FWM or the like), then the input power PFinm applied to the transmission path is fixed, and the nonlinear phase shift φFm of the fiber transmission path is calculated as φFm=PFinm× Leffm (the equation (3a)), and the nonlinear phase shift φDm of the DCM is calculated as φDm=φspan,ave−φFm (the equation (5)). The input power PDinm applied to the DCM is then determined as PDinm=Leffm/φDm (the equation (3b)).

[S5] The input power PFinm applied to the transmission path and the input power PDinm applied to the DCM, thus determined, are sent by an OSC signal to the node which controls the span m, and are set in the node.

In the above embodiment, after the input power applied to the transmission path is determined, the input power applied to the DCM is determined. However, if upper and lower limits on the input power applied to the transmission path are not strict and a certain margin is available for the OSNR, then the input power applied to the DCM may first be determined so as to be φDm<φspan,ave, and then the input power applied to the transmission path may be determined as φFm=φspan,ave−φDm.

Figure 11:
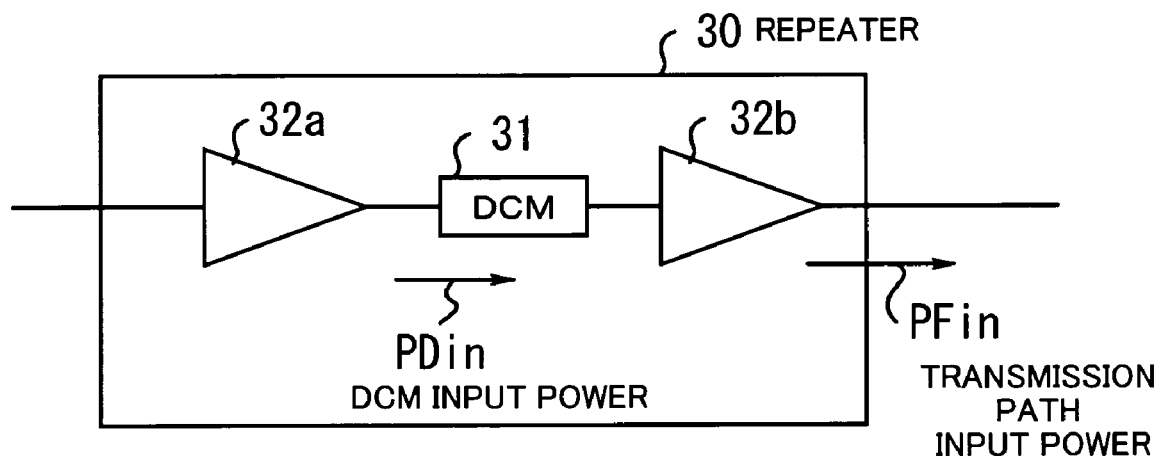
FIG. 11 is a block diagram of a repeater.

FIG. 11 shows details of a repeater. A repeater 30 on the transmission path comprises optical amplifiers 32a, 32b and a DCM 31. The DCM 31 is disposed between the optical amplifiers 32a, 32b. Since the repeater 30 is of such an arrangement, for adjusting the input power PDin applied to the DCM, the output power of the optical amplifier 32a is controlled, and for adjusting the input power PFin applied to the transmission path, the output power of the optical amplifier 32b is controlled.

According to the first embodiment, as described above, φspan,ave produced by dividing the target value φtgt for the nonlinear phase shift of the through path by the number of spans is equally assigned to the spans, and the input power applied to the transmission path and the input power applied to the DCM are determined for each span to perform dispersion compensation control such that the nonlinear phase shift of each span is represented by φspan,ave. In the above embodiment, the input power applied to the transmission path is first fixed, and then the input power applied to the DCM is determined. Since the target value φtgt is achieved on the through path, a maximum residual dispersion tolerance is obtained for increased reception quality of an optical signal.

A dispersion compensation control process according to the second embodiment of the present invention will be described below. According to the second embodiment, the input power applied to the transmission path is changed depending on a light loss caused by a span (hereinafter referred to as span loss).

An OSNR degradation that contributes to the overall system of each span is greater as the input level of a node next to the span is lower. If the optical amplifiers which are responsible for noise are optimized to the respective input levels, then the amount of the OSNR degradation is inversely proportional to the anti-logarithm $10^{\wedge}(-\Delta pin/10)$ (where $\Delta$ pin represents a variation with respect to the node input level serving as a reference) of the input level. For example, on the assumption that the loss of each span is not taken into account, if there is a span for transmitting a signal with high power over a zone having a short distance (a loss is small) or a span for transmitting a signal with low power over a zone having a long distance (a loss is large), the input levels of the next nodes are varied greatly, causing a greater OSNR degradation than if all the nodes have the same input level. According to the second embodiment, the input power applied to the transmission path is set such that a signal is transmitted with higher power over a zone where a span loss is greater and a signal is transmitted with lower power over a zone where a span loss is smaller. With this arrangement, even if the transmission path includes zones having different span losses, the OSNR degradation can be made smaller than if all the nodes have the same input level.

Figure 12:
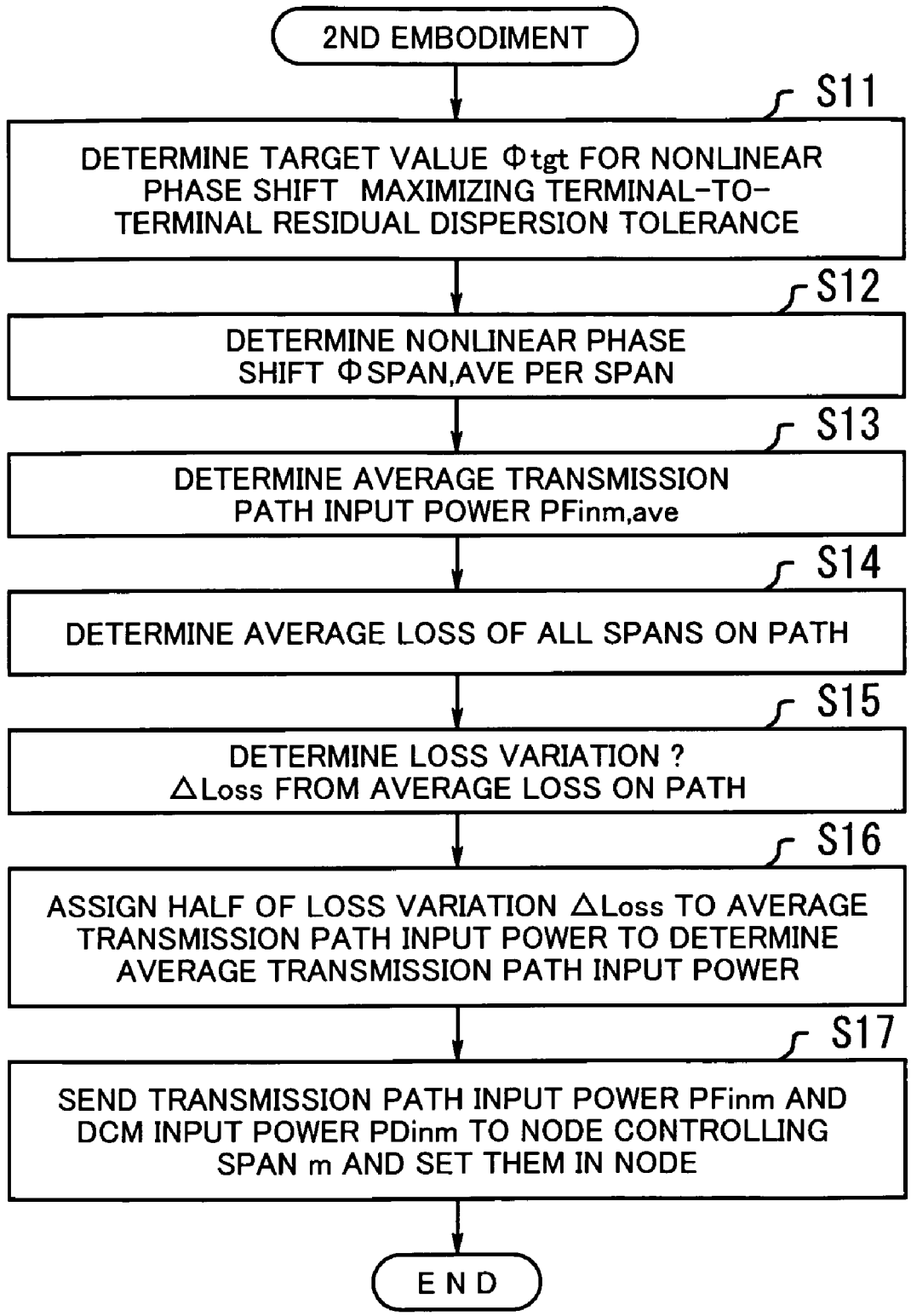
FIG. 12 is a flowchart of a processing sequence according to a second embodiment of the present invention.

FIG. 12 shows a processing sequence according to the second embodiment of the present invention.

[S11] A target value $\phi$tgt for the nonlinear phase shift which maximizes the residual dispersion tolerance of the through path from terminal to terminal is determined.

[S12] A nonlinear phase shift $\phi$span,ave per span is determined according to the equation (4).

[S13] A nonlinear phase shift of the span m is set (if the input power PDinm applied to the DCM is determined, then $\phi$Dm is determined from the equation (3b)), the nonlinear phase shift $\phi$Fm of the fiber transmission path is calculated as $\phi$Fm=$\phi$span,ave-$\phi$Dm, and the average input power PFinm,ave applied to the transmission path is determined as PFinm,ave=$\phi$Fm/Leffm (the equation (3a)).

[S14] An average loss of all the spans on the path is determined. For example, if there are two spans 1, 2 on the path, the span 1 has a loss of 10, and the span 2 has a loss of 15, then the average loss is calculated as 12.5 (=(10+15)/2).

[S15] A loss variation $\Delta$Lossm of the span m is determined from the average loss of all the spans on the path. For example, a loss variation $\Delta$Loss1 of the span 1 is −2.5 which is produced by subtracting the average loss 12.5 from the loss 10 of the span 1, and a loss variation ?Loss2 of the span 2 is +2.5 which is produced by subtracting the average loss 12.5 from the loss 15 of the span 2.

[S16] Half of the loss variation $\Delta$Lossm of the span m is assigned to a power variations of the average input power PFinm,ave applied to the transmission path, thereby determining the input power PFinm applied to the span m of the transmission path according to the following equation (6):

$$PFinm = PFinm, ave + \frac{\Delta Lossm}{2} \quad (6)$$

[S17] The input power PFinm applied to the transmission path and the input power PDinm applied to the DCM, thus determined, are sent to the node which controls the span m, and are set in the node.

According to the second embodiment, as described above, the input power applied to the transmission path is determined depending on the span loss. Specifically, since $\Delta$Loss is of a negative value in a zone having a small span loss, the input power applied to the transmission path is small with respect to the span according to the equation (6), and since $\Delta$Loss is of a positive value in a zone having a large span loss, the input power applied to the transmission path is large with respect to the span.

Thus, the input power applied to the transmission path can be set to a higher level for a zone having a larger span loss and to a lower level for a zone having a smaller span loss. Consequently, the OSNR degradation for achieving the same nonlinear phase shift with respect to networks having different span losses, i.e., different span lengths, can be reduced.

Figure 13:
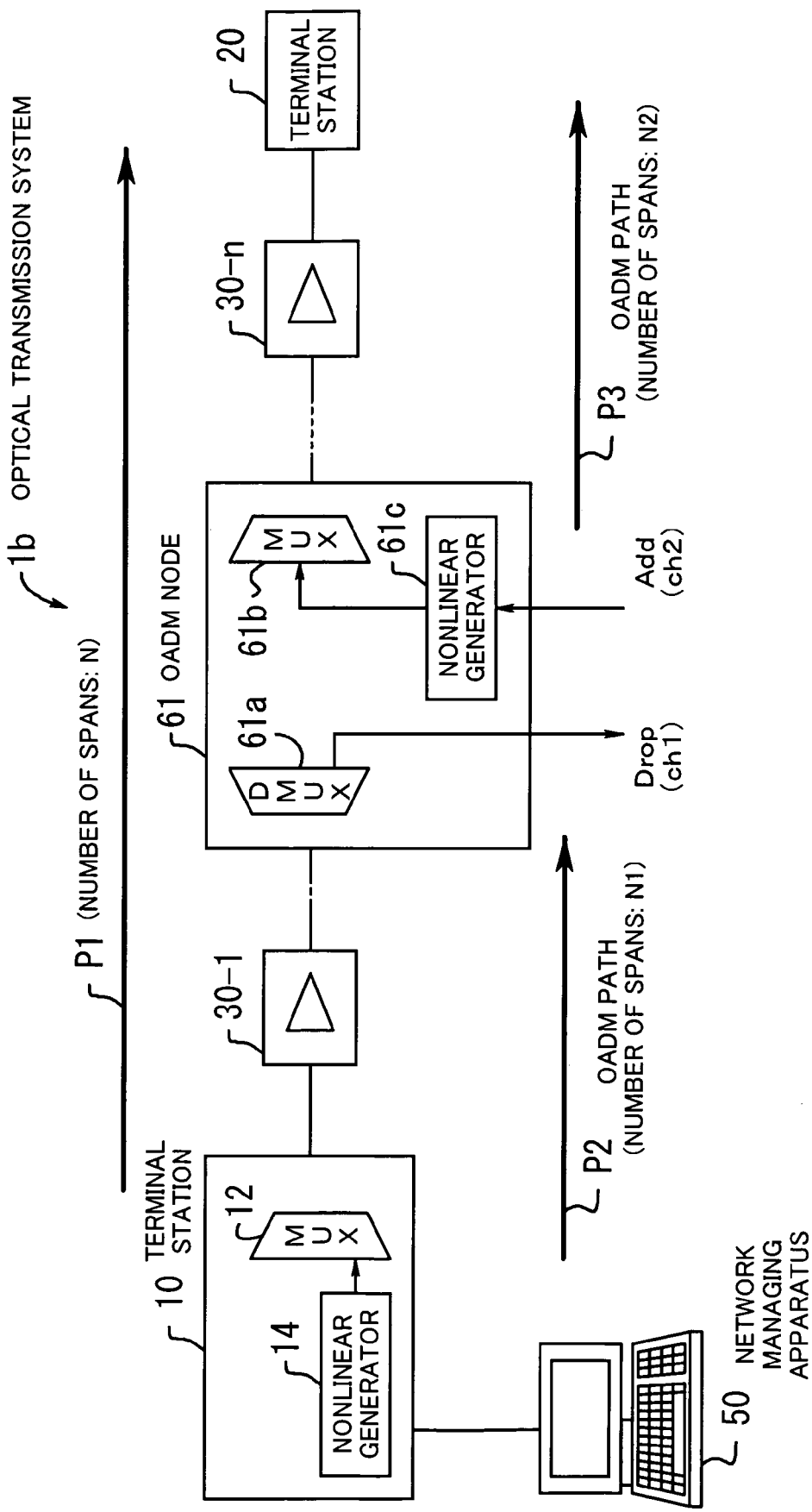
FIG. 13 is a block diagram of an optical transmission system including an OADM node.

A dispersion compensation control process according to the third embodiment of the present invention will be described below. The dispersion compensation control process according to the third embodiment is a dispersion compensation control process for a network including an OADM node. FIG. 13 shows in block form an optical transmission system 1b including an OADM node. The optical transmission system 1b has a terminal station 10, repeaters 30-1 through 30-n, and a terminal station 20 which are connected in a serial sequence by a transmission path on which an OADM node 61 is disposed. A network managing apparatus 50 is connected to the terminal station 10.

The terminal station 10 include a MUX 12 and a nonlinear generator 14. The OADM node 61 includes a DMUX 61a, a MUX 61b, and a nonlinear generator 61c (only those components required to describe the third embodiment are shown). The nonlinear generators 14, 61c are connected in each channel, and generate a certain nonlinear phase shift according to an instruction from the network managing apparatus 50.

It is assumed that a path from terminal to terminal is referred to as a path P1 (the number of spans is N), a path from the terminal station 10 to the OADM node 61 as an OADM path P2 (the number of spans is N1), and a path from the OADM node 61 to the terminal station 20 as an OADM path P3 (the number of spans is N2).

Figure 14:
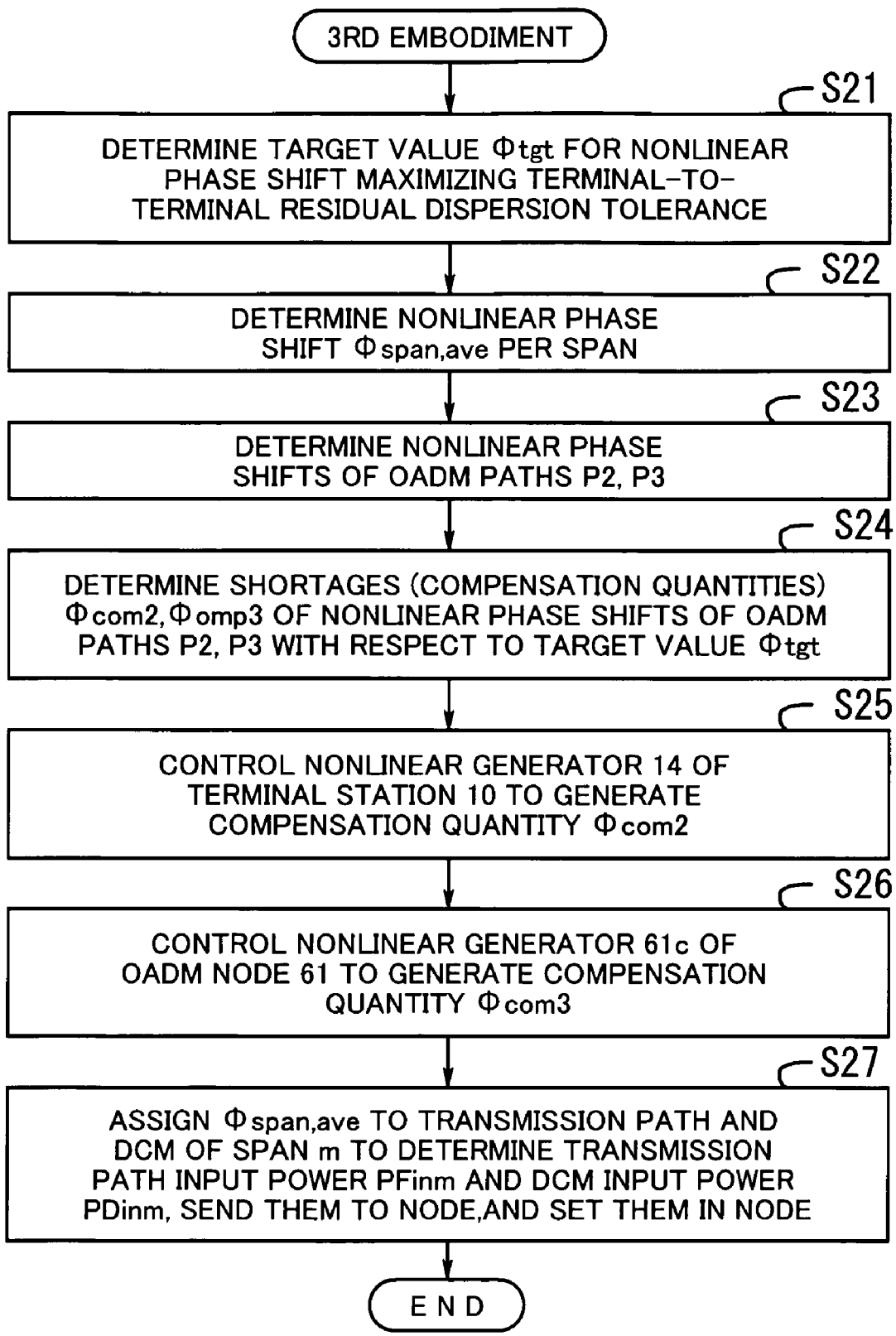
FIG. 14 is a flowchart of a processing sequence according to a third embodiment of the present invention.

FIG. 14 shows a processing sequence according to the third embodiment of the present invention. The illustrated processing sequence represents an operation flow of the network managing apparatus 50 which is carried out as a dispersion compensation control process for the optical transmission system 1b.

[S21] A target value $\phi$tgt for the nonlinear phase shift which maximizes the residual dispersion tolerance of the through path from terminal to terminal is determined. [S22] A nonlinear phase shift $\phi$span,ave per span is determined according to the equation (4).

[S23] A nonlinear phase shifts of the OADM paths P2, P3 are determined (the nonlinear phase shift of the path P1 is $\phi$tgt determined in step S21). The nonlinear phase shift of the OADM path P2 is determined as $\phi$span,ave×N1, and the nonlinear phase shift of the OADM path P3 is determined as $\phi$span,ave×N2.

[S24] Shortages of the nonlinear phase shifts of the OADM paths P2, P3 with respect to the target value $\phi$tgt, i.e., nonlinear phase shifts to be compensated for, are determined. For the OADM path P2, an OADM path compensation quantity $\phi$comp2=the target value $\phi$tgt−(the nonlinear phase shift of the OADM path P2)=$\phi$tgt−$\phi$span,ave×N1. Similarly, for the OADM path P3, an OADM path compensation quantity $\phi$comp3=the target value $\phi$tgt−(the nonlinear phase shift of the OADM path P3)=$\phi$tgt−$\phi$span,ave×N2.

[S25] If a channel 1, for example, is dropped from the OADM path P2 at the OADM node 61, then the nonlinear generator 14 in the terminal station 10 generates the OADM path compensation quantity $\phi$comp2 with respect to the wavelength signal in the channel 1 under the control of an OSC signal from the network managing apparatus 50.

[S26] If a channel 2, for example, is added to from the OADM path P3 at the OADM node 61, then the nonlinear generator 61c in the OADM node 61 generates the OADM path compensation quantity φcomp3 with respect to the wavelength signal in the channel 2 under the control of an OSC signal from the network managing apparatus 50.

[S27] The nonlinear phase shift of the span m is assigned to the nonlinear phase shift of the transmission path and the nonlinear phase shift of the DCM, thus determining the input power applied to the transmission path and the input power applied to the DCM in the same manner as the operation sequences according to the first and second embodiments. The input power applied to the transmission path and the input power applied to the DCM, thus determined, are sent to the corresponding node, and are set in the node.

The nonlinear generator 14 is illustrated as being provided on the transmitting side for the channel. However, the nonlinear generator 14 may be provided on the receiving side for the channel. For example, a nonlinear generator may be provided in the OADM node 61 for the dropped channel 1.

With the nonlinear generator on the receiving side, the OADM node can perform a dual process to send a channel to the through path and drop the same channel. For example, if the channel 1 is to be dropped at the OADM node 61 and is also to be sent to the terminal station 20, then a nonlinear generator for the channel 1 may be provided in a channel-1 receiver in the OADM node 61 for adding a compensation quantity to only the dropped channel 1, without affecting the channel 1 sent via the through path. Therefore, the channel 1 can be both sent via the through path and dropped. A nonlinear generator may also be provided in a receiver for receiving a channel that is added.

Figure 15:
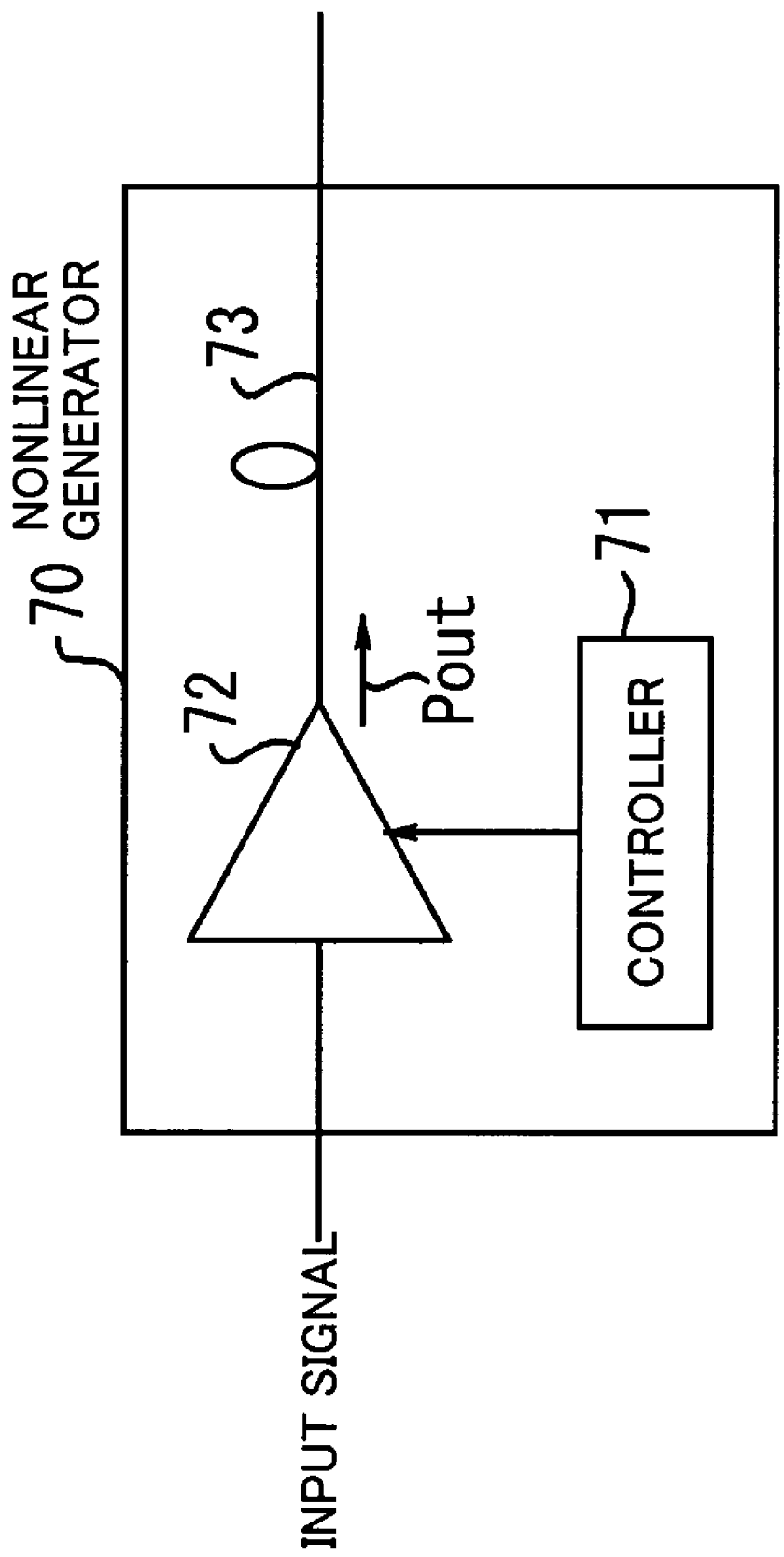
FIG. 15 is a block diagram of a nonlinear generator.

FIG. 15 shows details of a nonlinear generator 70. The nonlinear generator 70 has a controller 71, an amplifier 72, and a nonlinear generation fiber 73. The controller 71 is instructed by the network managing apparatus 50 to control the amplifier 72 to amplify an input signal applied thereto. The amplifier 72 is controlled by the controller 71 to amplify an applied input signal, and outputs the amplified signal through the nonlinear generation fiber 73, which generates a certain nonlinear phase shift.

The nonlinear phase shift φ generated when the controller 71 controls the amplifier 72 to produce an amplified output signal Pout is expressed by the equation (7) shown below. In the equation (7), λ represents the wavelength, n2 the nonlinear coefficient, Aeff the effective cross-sectional area, Leff the effective fiber length, and Pout the input power (the output power from the amplifier 72).

$$\phi = \frac{2\pi}{\lambda} \cdot \frac{n2}{Aeff} \cdot Pout \cdot Leff \quad (7)$$

According to the third embodiment, as described above, if an OADM path is present in a network, then a shortage per OADM path with respect to the target value φtgt for the longest through path is determined as a compensation quantity for the nonlinear phase shift, and the nonlinear generator is controlled to generate the compensation quantity. Thereafter, φF, φD are determined from φspan,ave to determine the input power applied to the transmission path and the input power applied to the DCM, as with the first and second embodiments.

Since the OADM 61 can receive the channel to be dropped which flows through the OADM path P2 without impairing the eye aperture degradation (in the above embodiment, the reception point for the channel 1 in the DMUX 61a in the OADM node 61 can receive the channel 1 without impairing the eye aperture degradation), no limitation is posed on the wavelength to be dropped. Similarly, the terminal station 20 can receive the channel to be added which flows through the OADM path P3 without impairing the eye aperture degradation, and hence no limitation is posed on the wavelength to be added.

If there are a plurality of OADM nodes on the transmission path, then a nonlinear generator is provided in each of the OADM nodes, and a compensation quantity φcomp may be generated in a distributed fashion by the nonlinear generators. If the target value φtgt cannot be achieved in a network only by controlling the input power applied to the transmission path and the input power applied to the DCM irrespective of the presence of an OADM path, then a nonlinear generator may be added to the network to control the nonlinear phase shift to reach the target value.

A dispersion compensation control process according to the fourth embodiment of the present invention will be described below. The dispersion compensation control process according to the fourth embodiment is a dispersion compensation control process to be performed on a network including an OADM node for achieving an OADM path compensation quantity by setting the power level of a channel to be added/dropped to a value higher than a channel in a through path.

Figure 16:
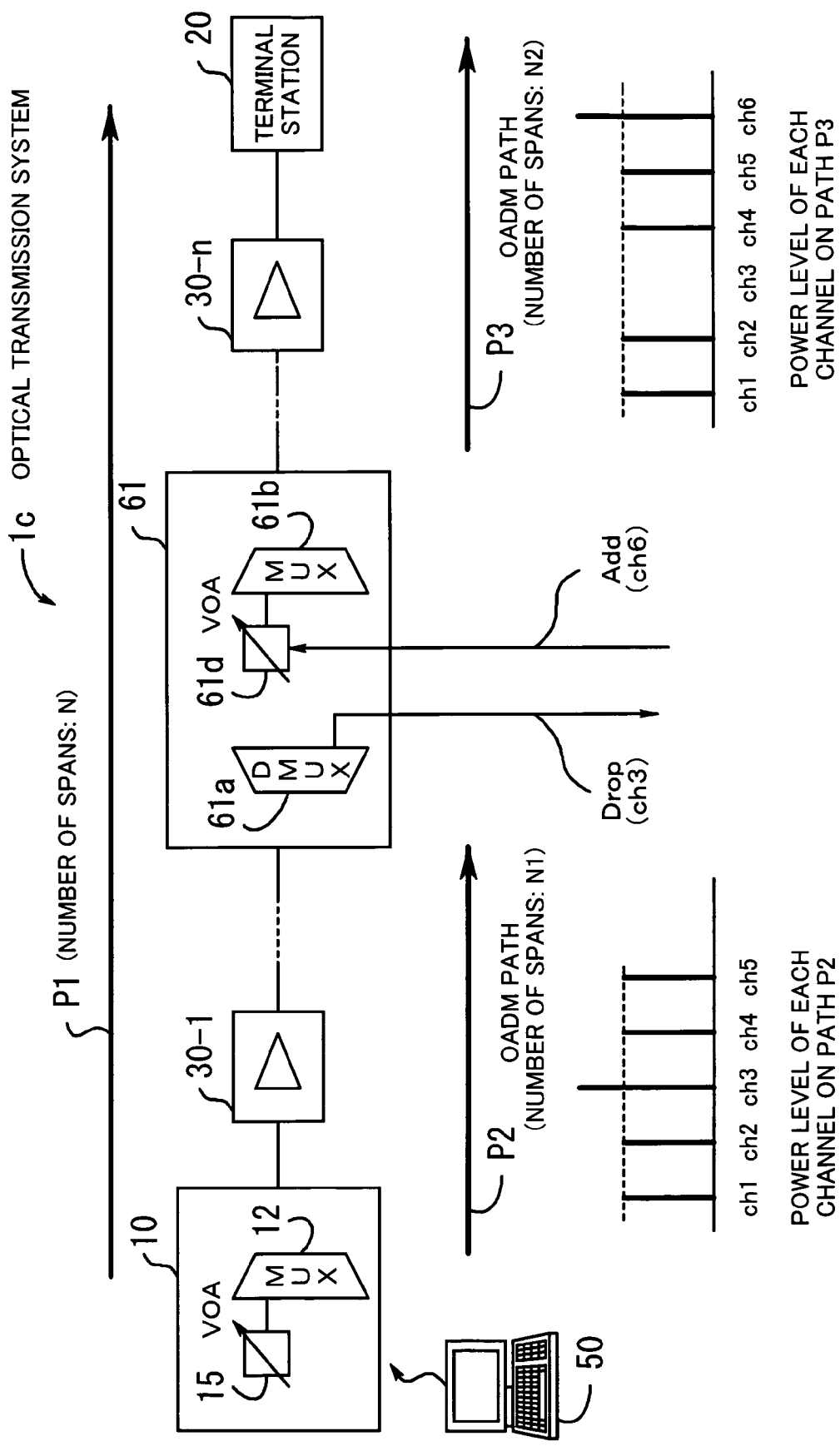
FIG. 16 is a block diagram showing the manner in which an optical transmission system according to a fourth embodiment of the present invention operates.

FIG. 16 shows in block form the manner in which an optical transmission system 1c according to the fourth embodiment of the present invention operates. The optical transmission system 1c has a terminal station 10, repeaters 30-1 through 30-n, and a terminal station 20 which are connected in a serial sequence by a transmission path on which an OADM node 61 is disposed. A network managing apparatus 50 is connected to the terminal station 10.

The terminal station 10 include a MUX 12 and VOA (Variable Optical Attenuator) 15. The OADM node 61 includes a DMUX 61a, a MUX 61b, and a VOA 61d (only those components required to describe the fourth embodiment are shown). The VOAs 15, 61d are connected in each channel, and variably sets a power level to a predetermined value based on an instruction from the network managing apparatus 50.

It is assumed that a channel 3 is dropped and a channel 6 is added at the OADM node 61. The level of the channel 3 to be dropped is set to a power value higher than the levels of channels 1, 2, 4, 5 that flow from the terminal station 10 to the terminal station 20 by controlling the VOA 15 which corresponds to the channel 3.

The level of the channel 6 to be added is also set to a power value higher than the levels of the channels 1, 2, 4, 5 by controlling the VOA 61d which corresponds to the channel 6. The OADM path compensation quantity is adjusted by thus setting the level of a channel to be added/dropped to a value higher than channels in the longest path.

Figure 17:
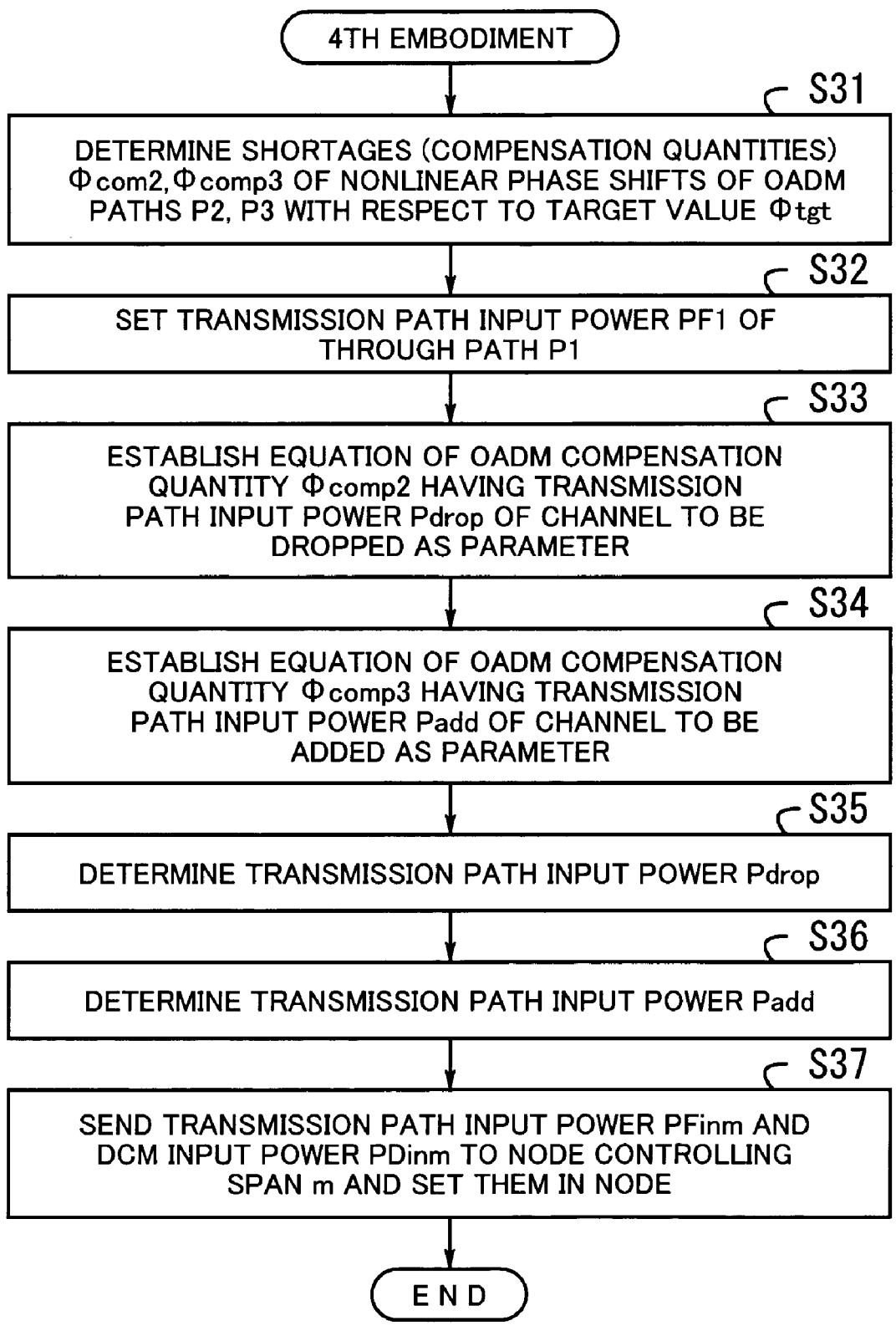
FIG. 17 is a flowchart of a processing sequence according to the fourth embodiment.

FIG. 17 shows a processing sequence according to the fourth embodiment. In the fourth embodiment, the processing in steps S21 through S24 shown in FIG. 14 is carried out in the same manner as in the third embodiment. The processing sequence according to the fourth embodiment from the stage where the OADM compensation quantities φcomp2, φcomp3 for the respective OADM paths P2, P3 are determined.

[S31] The OADM path compensation quantity φcomp2 of the OADM path P2 is determined as φcomp2=φtgt−φspan, ave×N1, and the OADM path compensation quantity φcomp3 of the OADM path P3 is determined as φcomp3=φtgt−φspan, ave×N2.

[S32] The input power PF1 applied to the transmission path in the path P1 which is required for a channel flowing from the terminal station 10 to the terminal station 20 is set in the terminal station 10.

[S33] If the input power applied to the transmission path at the terminal station 10 for a channel to be dropped at the OADM node 61 is represented by Pdrop, then the OADM path compensation quantity φcomp2 of the OADM path P2 is expressed by the following equation (8):

$$\phi comp2 = \phi span, ave \cdot \frac{PFdrop - PF1}{PF1} \cdot N1 \quad (8)$$

[S34] If the input power applied to the transmission path at the OADM node 61 for a channel to be added at the OADM node 61 is represented by Padd, then the OADM path compensation quantity φcomp3 of the OADM path P3 is expressed by the following equation (9):

$$\phi comp3 = \phi span, ave \cdot \frac{PFadd - PF1}{PF1} \cdot N2 \quad (9)$$

[S35] The OADM path compensation quantity φcomp2 determined in step S31 and the OADM path compensation quantity φcomp2 according to the equation (8) are interconnected by the equality sign, determining the input power Pdrop applied to the transmission path for a channel to be dropped.

[S36] The OADM path compensation quantity φcomp3 determined in step S31 and the OADM path compensation quantity φcomp3 according to the equation (9) are interconnected by the equality sign, determining the input power Padd applied to the transmission path for a channel to be added.

[S37] As the input power PFinm applied to the transmission path is determined, the input power PDinm applied to the DCM is also determined, and they are sent to and set in the node.

According to the fourth embodiment, as described above, the power level of a channel to be dropped/added is set to a value higher than a channel in the through path to achieve an OADM path compensation quantity for dispersion compensation control. For determining the input power applied to the transmission path, the total power PF1+PFdrop+PFadd is set so as to be equal at the outputs of all the nodes (the terminal stations and the OADM node).

Figure 18:
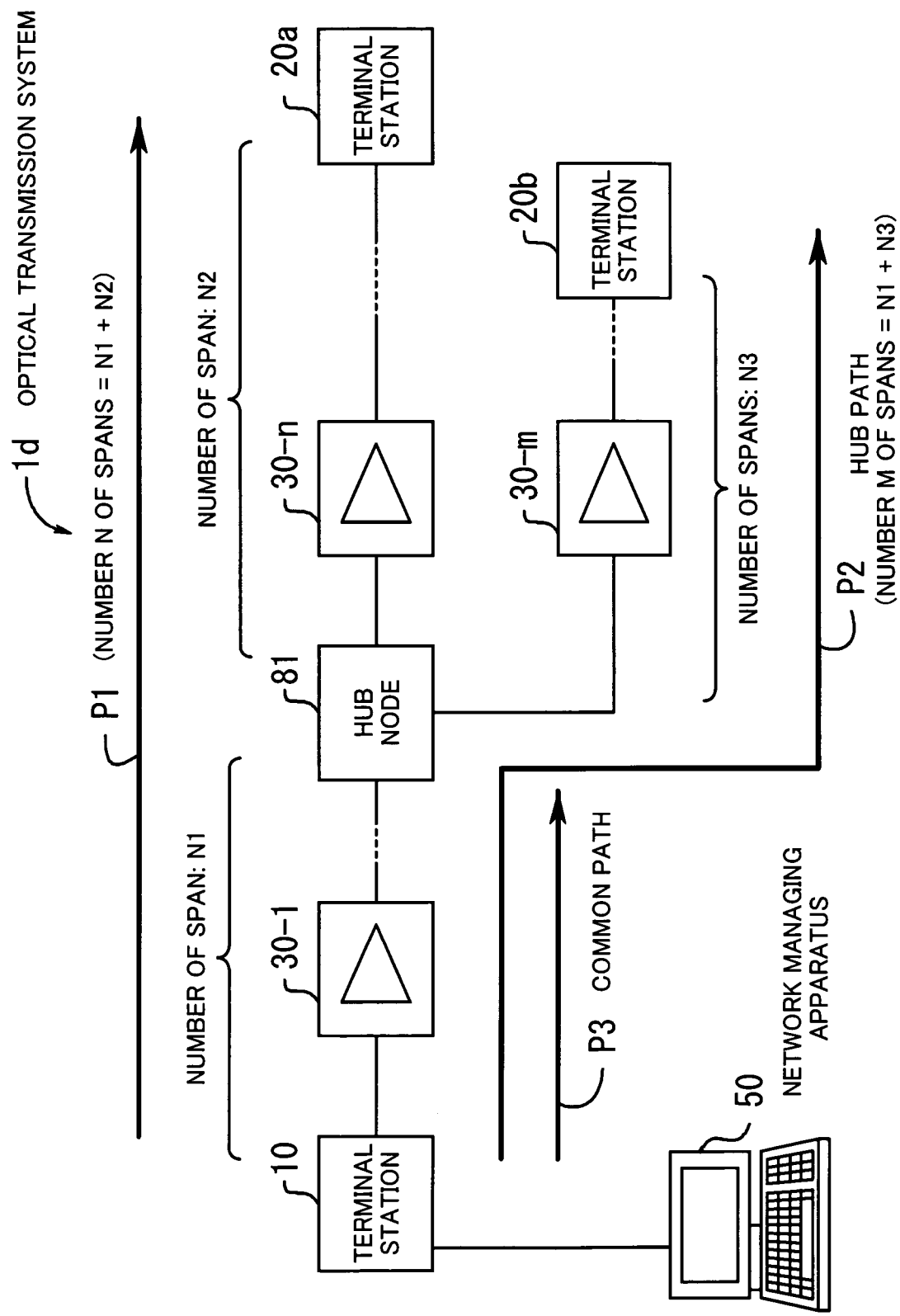
FIG. 18 is a block diagram of an optical transmission system including a HUB node.

A dispersion compensation control process according to the fifth embodiment of the present invention will be described below. The dispersion compensation control process according to the fifth embodiment is a dispersion compensation control process to be performed on a network including a HUB node. FIG. 18 shows in block form an optical transmission system 1d including a HUB node. The optical transmission system 1d has terminal stations 10, 20a, 20b, repeaters 30-1 through 30-n, 30-m, a HUB node 81, and a network managing apparatus 50.

It is assumed that the number of spans from the terminal station 10 to the HUB node 81 is N1, the number of spans from the HUB node 81 to the terminal station 20a is N2, the number of spans from the HUB node 81 to the terminal station 20b is N3, N1+N2=N, and N1+N3=M. It is also assumed that a path from the terminal station 10 through the HUB node 81 to the terminal station 20a is referred to as a path P1, a path from the terminal station 10 through the HUB node 81 to the terminal station 20b as a HUB path P2, and a path from the terminal station 10 to the HUB node 81 as a common path P3.

Figure 19:
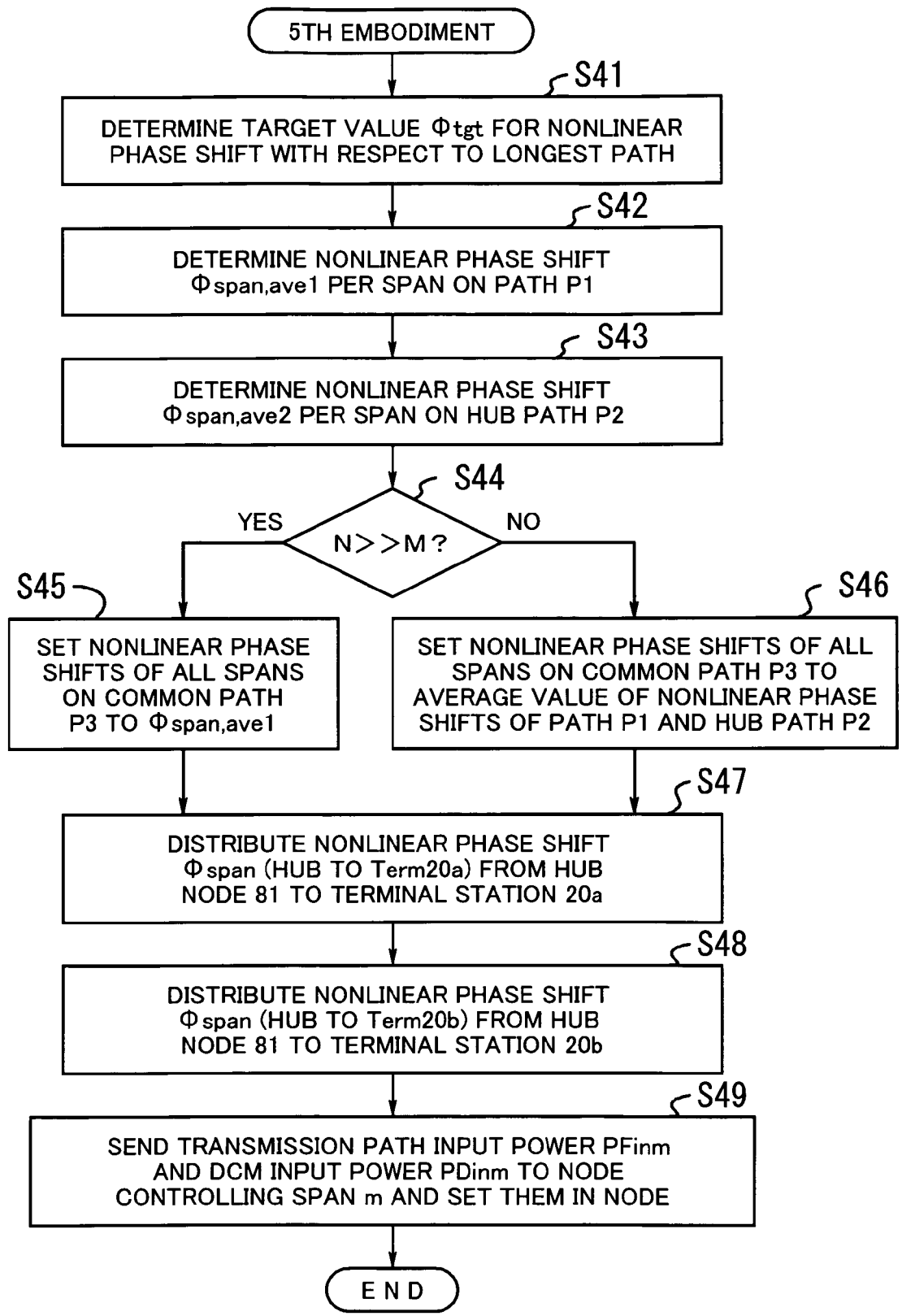
FIG. 19 is a flowchart of a processing sequence according to a fifth embodiment of the present invention.

FIG. 19 shows an operation sequence according to the fifth embodiment. The illustrated processing sequence represents an operation flow of the network managing apparatus 50 which is carried out as a dispersion compensation control process for the optical transmission system 1d.

[S41] A target value φtgt for the nonlinear phase shift with respect to the longest path (either the path P1 or the path P2) is determined.

[S42] A nonlinear phase shift φspan,ave1 per span is determined with respect to the path P1 (φspan,ave1=φtgt/N).

[S43] A nonlinear phase shift φspan,ave2 per span is determined with respect to the HUB path P2 (φspan,ave2=φtgt/M).

[S44] A nonlinear phase shift per span is determined with respect to the common path P3. If N>>M, then control goes to step S45, and if N is about the same as M, then control goes to step S46.

[S45] All the nonlinear phase shifts for the spans on the common path P3 are set to φspan,ave1. Control then goes to step S47.

[S46] All the nonlinear phase shifts for the spans on the common path P3 are set to an average value of the nonlinear phase shifts with respect to the path P1 and the HUB path P1 ((φspan,ave1+φspan,ave2)/2).

[S47] The nonlinear phase shift φspan(HUB to Term20a) for the remaining spans (from the HUB node 81 to the terminal station 20a) on the path P1 is distributed according to the equation (10) shown below. The equation (10) represents the division of a value produced by subtracting the nonlinear phase shift per span on the common path from the target value φtgt, by the number N2 of spans from the HUB node 81 to the terminal station 20a.

$$\phi span(HUB \text{ to } Term20a) = \frac{\phi tgt - \phi span(Term10 \text{ to } HUB)}{N2} \quad (10)$$

[S48] The nonlinear phase shift φspan(HUB to Term20b) for the remaining spans (from the HUB node 81 to the terminal station 20b) on the path P2 is distributed according to the equation (11) shown below. The equation (11) represents the division of a value produced by subtracting the nonlinear phase shift per span on the common path from the target value φtgt, by the number N3 of spans from the HUB node 81 to the terminal station 20b.

$$\phi span(HUB \text{ to } Term20b) = \frac{\phi tgt - \phi span(Term10 \text{ to } HUB)}{N3} \quad (11)$$

[S49] The nonlinear phase shift of each span is assigned to the nonlinear phase shift of the transmission path and the nonlinear phase shift of the DCM, and the input power PFinm applied to the transmission path and the input power PDinm applied to the DCM, thus determined, are sent to the corresponding node, and are set in the node.

According to the fifth embodiment, as described above, the nonlinear phase shift of the common path is changed depending on the lengths of the through path and the HUB path in the network including the HUB node, and the target value φtgt is assigned to each span on the through path and the HUB path. In this manner, the target value φtgt is achieved for not only the longest path, but also other branched paths in the network including the HUB node.

Figure 20:
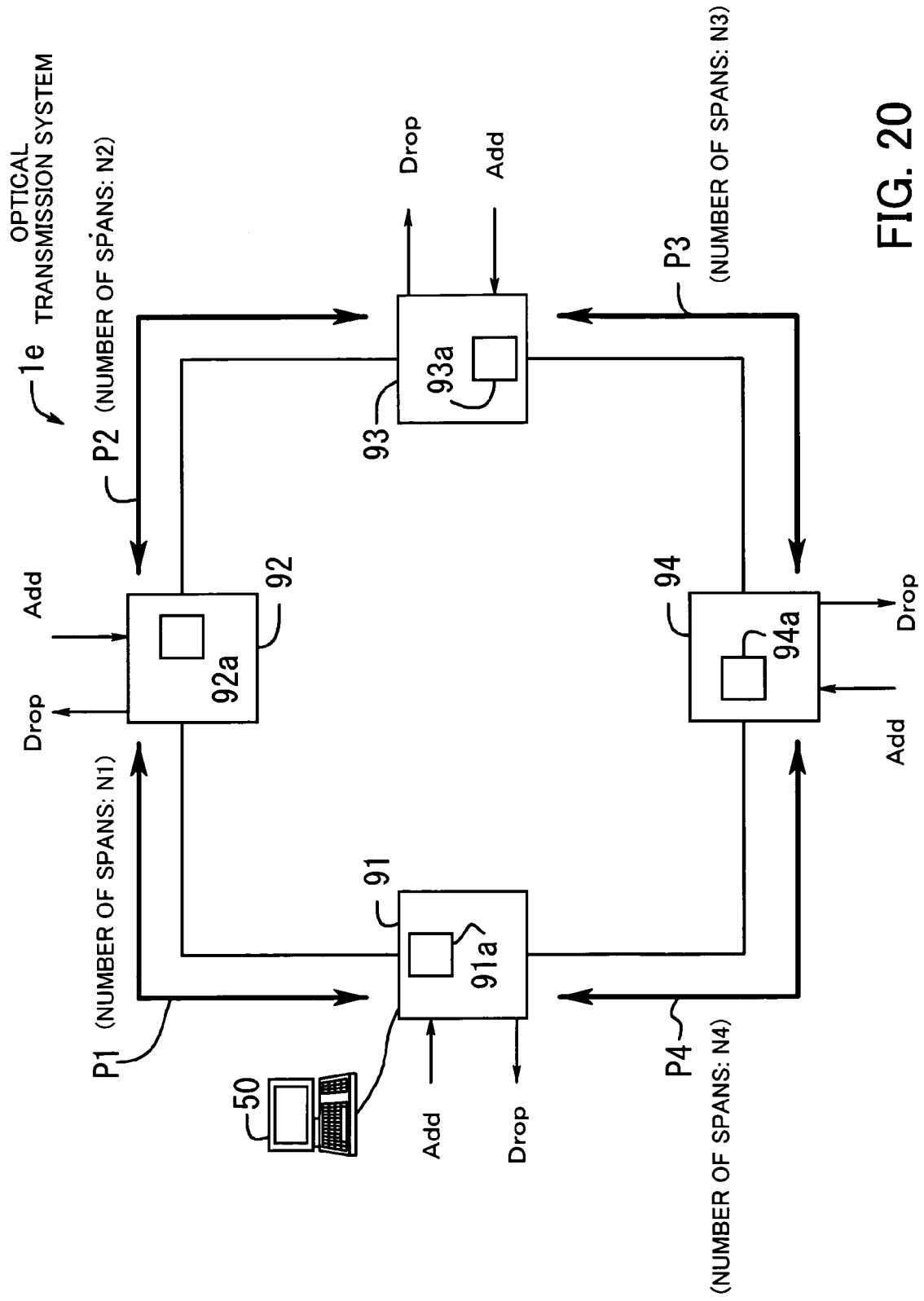
FIG. 20 is a block diagram of an optical transmission system configured as a ring network.

A dispersion compensation control process according to the sixth embodiment of the present invention will be described below. The dispersion compensation control process according to the sixth embodiment is a dispersion compensation control process to be performed on a ring network. FIG. 20 shows in block form an optical transmission system 1e configured as a ring network. The optical transmission system 1e has nodes 91 through 94, each having an OADM function, connected as a ring. A network managing apparatus 50 is connected to the node 91. The nodes 91 through 94 have respective nonlinear generators 91a through 94a provided for each channel at points for adding signals. Repeaters on the transmission path are omitted from illustration.

It is assumed that a path from the node 91 to the node 92 is referred to as an OADM path P1 (the number of spans is N1), a path from the node 92 to the node 93 as an OADM path P2 (the number of spans is N2), a path from the node 93 to the node 94 as an OADM path P3 (the number of spans is N3), a path from the node 94 to the node 95 as an OADM path P4 (the number of spans is N4), and the number of spans on the path of the entire ring as N (=N1+N2+N3+N4).

Figure 21:
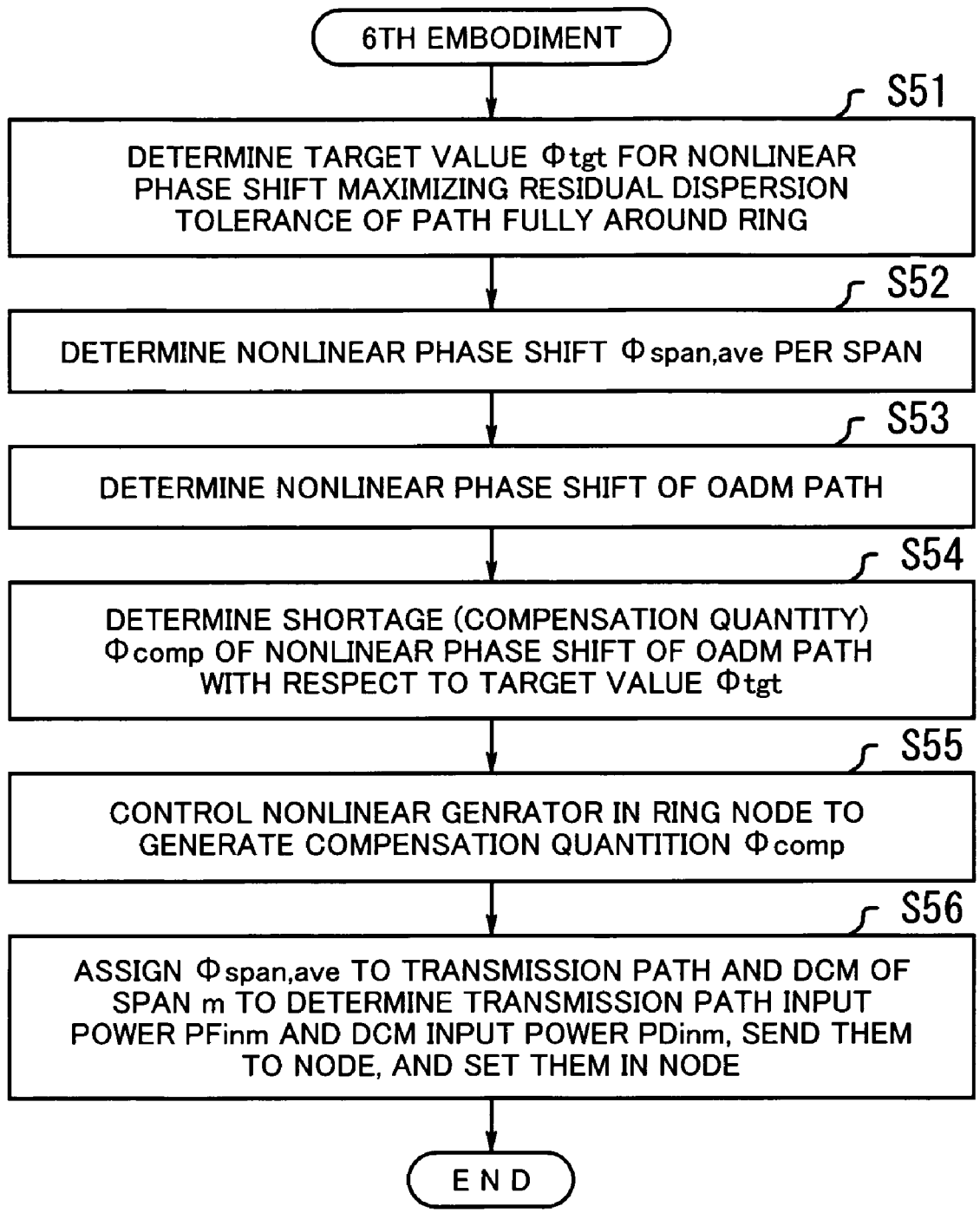
FIG. 21 is a flowchart of a processing sequence according to a sixth embodiment of the present invention.
Figure 22:
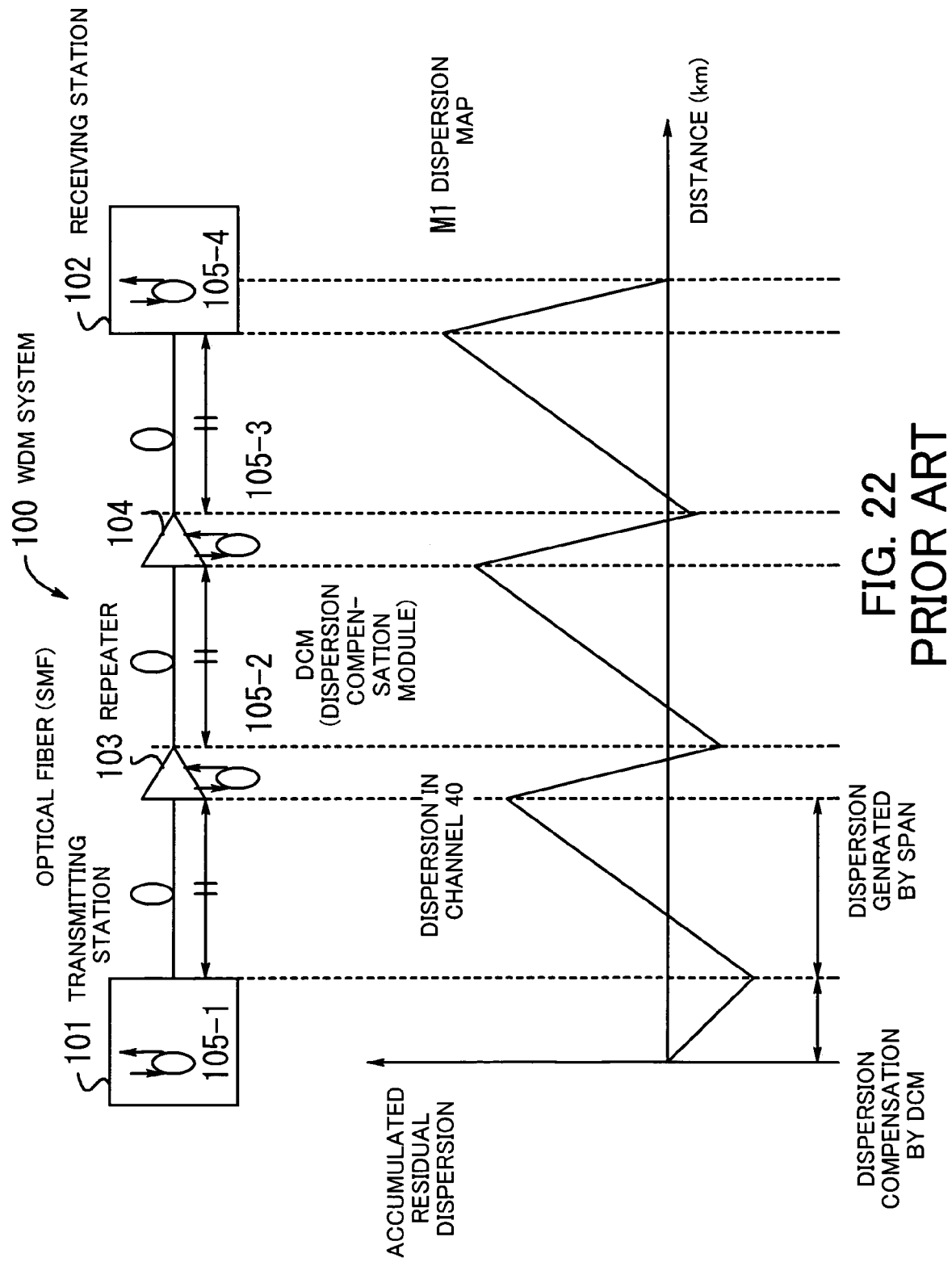
FIG. 22 is a diagram showing a dispersion map.

FIG. 21 shows an operation sequence according to the sixth embodiment. The illustrated processing sequence represents an operation flow of the network managing apparatus 50 which is carried out as a dispersion compensation control process for the optical transmission system 1e.

[S51] A target value $\phi$tgt for the nonlinear phase shift which maximizes the residual dispersion tolerance of the path of the entire ring is determined.

[S52] A nonlinear phase shift $\phi$span,ave per span is determined according to the equation (4).

[S53] Nonlinear phase shifts with respect to the OADM paths P1 through P4 are determined. The nonlinear phase shift of the OADM path P1 is determined as $\phi$span,ave×N1, the nonlinear phase shift of the OADM path P2 as $\phi$span,ave×N2, the nonlinear phase shift of the OADM path P3 is determined as $\phi$span,ave×N3, and the nonlinear phase shift of the OADM path P4 is determined as $\phi$span,ave×N4.

[S54] Shortages of the nonlinear phase shifts of the OADM paths P1 through P4 with respect to the target value $\phi$tgt, i.e., nonlinear phase shifts to be compensated for, are determined. For the OADM path P1, an OADM path compensation quantity $\phi$comp1=the target value−(the nonlinear phase shift of the OADM path P1)=$\phi$tgt−$\phi$span,ave×N1. Similarly, an OADM path compensation quantity $\phi$comp2=$\phi$tgt−$\phi$span,ave×N2, an OADM path compensation quantity $\phi$comp3=$\phi$tgt−$\phi$span,ave×N3, and an OADM path compensation quantity $\phi$comp4=$\phi$tgt−$\phi$span,ave×N4.

[S55] The nonlinear generators 91a through 94a are controlled to generate nonlinear phase shifts. For example, if the channel 1 is to be added to the OADM path 1 at the node 91 and to be dropped from the OADM path 1 at the node 92, then the nonlinear generator 91a in the node 91 generates an OADM path compensation quantity $\phi$comp1 for the wavelength signal in the channel 1. If the channel 2 is to be added at the node 91 and to be dropped at the node 93, then the nonlinear generator 91a in the node 91 generates an OADM path compensation quantity $\phi$comp1+$\phi$comp2 for the wavelength signal in the channel 2.

[S56] The nonlinear phase shift of the span m is assigned to the nonlinear phase shift of the transmission path and the nonlinear phase shift of the DCM, and the input power PFinm applied to the transmission path and the input power PDinm applied to the DCM are determined. The input power PFinm applied to the transmission path and the input power PDinm applied to the DCM, thus determined, are sent to the corresponding node, and are set in the node.

In this embodiment, the nonlinear generator is illustrated as being provided on the transmitting side for the channel to be added. However, the nonlinear generator 14 be provided on the receiving side for the channel, as with the third embodiment.

According to the sixth embodiment, as described above, if OADM paths are present on a ring network, a shortage per OADM path with respect to the target value $\phi$tgt for the longest through path is determined as a compensation quantity for the nonlinear phase shift, and the nonlinear generator in the ring node is controlled to generate the compensation quantity. Thereafter, $\phi$F, $\phi$D are determined from $\phi$span,ave to determine the input power applied to the transmission path and the input power applied to the DCM, as with the first and second embodiments.

According to the present invention, as described above, a process of controlling the power of an optical signal is performed to adjust a nonlinear quantity, using, as a target value, a nonlinear phase shift which maximizes a residual dispersion tolerance, so that a nonlinear phenomenon is appropriately utilized to keep the residual dispersion tolerance. With this arrangement, highly accurate dispersion compensation can be carried out on networks having different span losses and networks wherein a plurality of paths including an OADM node or a HUB node are present in the system, for thereby increasing optical transmission quality.

The optical transmission system according to the present invention is arranged such that a target value for a nonlinear phase shift, which is an indication of a self-phase modulation caused by the transmission medium, to have a maximum residual dispersion tolerance, and at least one of the input powers applied to transmission paths connected to terminal stations or repeaters and the input powers applied to dispersion compensation modules is controlled to equalize the nonlinear phase shifts of the paths in the system to the target value. Accordingly, highly accurate dispersion compensation can be carried out on various networks including those having different span losses and those wherein a plurality of paths including an OADM node or a HUB node are present in the system, for thereby increasing optical transmission quality.

The foregoing is considered as illustrative only of the principles of the present invention. Further, since numerous modification and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of controlling an optical transmission system for compensating for chromatic dispersion that is caused when an optical signal is transmitted, comprising the steps of:
  determining a target value for a nonlinear phase shift, which is an indication of a self-phase modulation caused by a path through which said optical signal is transmitted, to have a maximum residual dispersion tolerance;
  determining at least one of the input power applied to a transmission path connected to a node providing said path and the input power applied to a dispersion compensation module providing said path, in order to equalize said nonlinear phase shift to the target value; and
  controlling said optical transmission system based on the determined input power;
  wherein if a loss of each of spans of said path differs from span to span, the average input power applied to the transmission path is determined from a nonlinear phase shift per span, which is produced by dividing said target value by the number of the spans, and half of a power variation from an average span loss is assigned to a power variation of the average input power applied to the transmission path thereby to determine the input power applied to the transmission path of the span.

2. The method according to claim 1, wherein a nonlinear phase shift per span, which is produced by dividing said target value by the number of spans of said path, is assigned to each of said spans, and the input power applied to the transmission path and the input power applied to the dispersion compensation module are determined per span such that the nonlinear phase shift of each span is of an assigned value.

3. An optical transmission system for transmitting an optical signal while compensating for chromatic dispersion, comprising:
   terminal stations for transmitting and receiving an optical signal through an optical fiber transmission path;
   repeaters disposed in said optical fiber transmission path for amplifying said optical signal;
   dispersion compensation modules disposed in said terminal stations and said repeaters for compensating for dispersion of said optical signal; and
   a dispersion compensation controller for determining a target value for a nonlinear phase shift,
   which is an indication of a self-phase modulation caused by a transmission medium of the optical fiber transmission path, to have a maximum residual dispersion tolerance, and adjusting at least one of the input powers applied to transmission paths connected to the terminal stations or the repeaters and the input powers applied to the dispersion compensation modules to equalize the nonlinear phase shifts of paths in the optical transmission system to said target value for a dispersion compensation control process;
   wherein with respect to a network having different span losses, said dispersion compensation controller determines the average input power applied to the optical fiber transmission path from an average nonlinear phase shift per span, which is produced by dividing said target value by the number of the spans, and assigns half of the difference between an average span loss and each of the span losses to a power variation of the average input power applied to the optical fiber transmission path thereby to determine the input power applied to the optical fiber transmission path of the span.

4. The optical transmission system according to claim 3, wherein said dispersion compensation controller assigns a nonlinear phase shift per span, which is produced by dividing said target value by the number of spans of said optical fiber transmission path, to each of said spans, and determining the input power applied to the optical fiber transmission path and the input power applied to the dispersion compensation modules, per span, such that the nonlinear phase shift of each span is of an assigned value.

5. The optical transmission system according to claim 3, further comprising a nonlinear generator if said target value cannot be achieved only by controlling the input power applied to the optical fiber transmission path and the input power applied to the dispersion compensation modules, wherein with respect to a network including an OADM node in an optical fiber transmission path, said dispersion compensation controller determines the difference between the target value for the nonlinear phase shift and a nonlinear phase shift caused by an OADM path as an OADM path compensation quantity, and controls said nonlinear generator to generate said OADM path compensation quantity.

6. The optical transmission system according to claim 3, wherein with respect to a network including an OADM node in an optical fiber transmission path, said dispersion compensation controller determines the difference between the target value for the nonlinear phase shift and a nonlinear phase shift caused by an OADM path as an OADM path compensation quantity, and sets the input power applied to an optical fiber transmission path in a channel which is added/dropped at said OADM node, to a value higher than the power of a channel flowing through a through path, in order to achieve said OADM path compensation quantity.

7. The optical transmission system according to claim 3, wherein with respect to a network having a HUB node with three or more routes in an optical fiber transmission path, said dispersion compensation controller determines a first nonlinear phase shift per span as a value which is produced by dividing the target value by the number of spans of a reference through path, determines a second nonlinear phase shift per span as a value which is produced by dividing the target value by the number of spans of another path, and wherein if said through path and said other path have substantially the same distance, said dispersion compensation controller determines a nonlinear phase shift per span on a common path as an average value of said first nonlinear phase shift and said second nonlinear phase shift, and if said through path and a HUB path have different distances, said dispersion compensation controller determines a nonlinear phase shift per span on the common path as said first nonlinear phase shift, and assigns the difference between said target value and the nonlinear phase shift per span on the common path to spans which are present from the HUB node to the terminal stations on said through path and spans which are present from said HUB node to terminal stations on said other path.

8. A method of compensating for chromatic dispersion that is caused when an optical signal is transmitted, comprising the steps of:
   determining a target value for a nonlinear phase shift, which is an indication of a self-phase modulation caused by a transmission medium, to have a maximum residual dispersion tolerance; and
   determining at least one of the input power applied to a transmission path connected to a node disposed in a network and the input power applied to a dispersion compensation module disposed in the network, in order to equalize said nonlinear phase shift of a path in a system to the target value for a dispersion compensation control process;
   wherein with respect to a network having different span losses, the average input power applied to the optical fiber transmission path is determined from an average nonlinear phase shift per span, which is produced by dividing said target value by the number of the spans, and half of the difference between an average span loss and each of the span losses is assigned to a power variation of the average input power applied to the optical fiber transmission path thereby to determine the input power applied to the optical fiber transmission path of the span.

9. The method according to claim 8, wherein a nonlinear phase shift per span, which is produced by dividing said target value by the number of spans of said path, is equally assigned to each of said spans, and the input power applied to the transmission path and the input power applied to the dispersion compensation module are determined per span such that the nonlinear phase shift of each span is of an assigned value.

10. The method according to claim 8, wherein a nonlinear generator is newly added if said target value cannot be achieved only by controlling the input power applied to the optical fiber transmission path and the input power applied to the dispersion compensation module, wherein with respect to a network including an OADM node in an optical fiber transmission path, the difference between the target value for the nonlinear phase shift and a nonlinear phase shift caused by an OADM path is determined as an OADM path compensation quantity, and said nonlinear generator is controlled to generate said OADM path compensation quantity.

11. The method according to claim 8, wherein with respect to a network including an OADM node in an optical fiber transmission path, the difference between the target value for the nonlinear phase shift and a nonlinear phase shift caused by an OADM path is determined as an OADM path compensation quantity, and the input power applied to an optical fiber transmission path in a channel which is added/dropped at said OADM node is set to a value higher than the power of a channel flowing through a through path, in order to achieve said OADM path compensation quantity.

12. The method according to claim 8, wherein with respect to a network having a HUB node in an optical fiber transmission path, a first nonlinear phase shift per span as a value which is produced by dividing the target value by the number of spans of a through path is determined, a second nonlinear phase shift per span as a value which is produced by dividing the target value by the number of spans of a HUB path is determined, and wherein if said through path and said HUB path have substantially the same distance, a nonlinear phase shift per span on a common path is determined as an average value of said first nonlinear phase shift and said second nonlinear phase shift, and if said through path and said HUB path have different distances, a nonlinear phase shift per span on the common path is determined as said first nonlinear phase shift, and the difference between said target value and the nonlinear phase shift per span on the common path is assigned to spans which are present from the HUB node to the terminal stations on said through path and spans which are present from said HUB node to terminal stations on said HUB path.

13. The method according to claim 8, wherein with respect to a network having nodes, each with an OADM function, connected in a ring by an optical fiber transmission path, the difference between the target value for the nonlinear phase shift of a path fully around said ring and a nonlinear phase shift caused by an OADM path is determined as an OADM path compensation quantity, and a nonlinear generator, which is disposed in each of said nodes for generating an indicated nonlinear phase shift is controlled to generate said OADM path compensation quantity.

14. An optical transmission system for transmitting an optical signal while compensating for chromatic dispersion, comprising:
terminal stations for transmitting and receiving an optical signal through an optical fiber transmission path;
repeaters disposed in said optical fiber transmission path for amplifying said optical signal;
dispersion compensation modules disposed in said terminal stations and said repeaters for compensating for dispersion of said optical signal; and
a dispersion compensation controller for determining a target value for a nonlinear phase shift,
which is an indication of a self-phase modulation caused by a transmission medium of the optical fiber transmission path, to have a maximum residual dispersion tolerance, and adjusting at least one of the input powers applied to transmission paths connected to the terminal stations or the repeaters and the input powers applied to the dispersion compensation modules to equalize the nonlinear phase shifts of paths in the optical transmission system to said target value for a dispersion compensation control process;
wherein with respect to a network having a HUB node with three or more routes in an optical fiber transmission path, said dispersion compensation controller determines a first nonlinear phase shift per span as a value which is produced by dividing the target value by the number of spans of a reference through path, determines a second nonlinear phase shift per span as a value which is produced by dividing the target value by the number of spans of another path, and wherein if said through path and said other path have substantially the same distance, said dispersion compensation controller determines a nonlinear phase shift per span on a common path as an average value of said first nonlinear phase shift and said second nonlinear phase shift, and if said through path and a HUB path have different distances, said dispersion compensation controller determines a nonlinear phase shift per span on the common path as said first nonlinear phase shift, and assigns the difference between said target value and the nonlinear phase shift per span on the common path to spans which are present from the HUB node to the terminal stations on said through path and spans which are present from said HUB node to terminal stations on said other path.

15. A method of compensating for chromatic dispersion that is caused when an optical signal is transmitted, comprising the steps of:
determining a target value for a nonlinear phase shift, which is an indication of a self-phase modulation caused by a transmission medium, to have a maximum residual dispersion tolerance; and
determining at least one of the input power applied to a transmission path connected to a node disposed in a network and the input power applied to a dispersion compensation module disposed in the network, in order to equalize said nonlinear phase shift of a path in a system to the target value for a dispersion compensation control process;
wherein with respect to a network having a HUB node in an optical fiber transmission path, a first nonlinear phase shift per span as a value which is produced by dividing the target value by the number of spans of a through path is determined, a second nonlinear phase shift per span as a value which is produced by dividing the target value by the number of spans of a HUB path is determined, and wherein if said through path and said HUB path have substantially the same distance, a nonlinear phase shift per span on a common path is determined as an average value of said first nonlinear phase shift and said second nonlinear phase shift, and if said through path and said HUB path have different distances, a nonlinear phase shift per span on the common path is determined as said first nonlinear phase shift, and the difference between said target value and the nonlinear phase shift per span on the common path is assigned to spans which are present from the HUB node to the terminal stations on said through path and spans which are present from said HUB node to terminal stations on said HUB path.

* * * * *